United States Patent

Tamura et al.

[11] Patent Number: 5,865,709
[45] Date of Patent: Feb. 2, 1999

[54] APPARATUS FOR CONTROLLING VEHICLE LOCK-UP CLUTCH, WHEREIN ENGINE OUTPUT IS REDUCED UPON RELEASING ACTION OF LOCK-UP CLUTCH

[75] Inventors: Tadashi Tamura, Aichi-ken; Kenichi Yoshizawa, Nagoya; Tokuyuki Takahashi, Owariasahi; Masahiro Kojima, Okazaki; Naoki Kato, Toyota, all of Japan

[73] Assignee: Toyota Jidosha Kabushiki Kaisha, Toyota, Japan

[21] Appl. No.: 827,904

[22] Filed: Apr. 7, 1997

[30] Foreign Application Priority Data

Apr. 17, 1996 [JP] Japan .................................. 8-095076

[51] Int. Cl.$^6$ ........................... F16H 61/14; B60K 41/02; F02D 29/02

[52] U.S. Cl. .............................. 477/181; 477/83; 477/109

[58] Field of Search .................................... 477/181, 174, 477/169, 109, 63, 83

[56] References Cited

U.S. PATENT DOCUMENTS

| | | | |
|---|---|---|---|
| 4,744,031 | 5/1988 | Takeda et al. ........................ | 477/63 X |
| 4,926,636 | 5/1990 | Tadokoro et al. ........................ | 477/33 |
| 5,085,301 | 2/1992 | Imamura et al. .................... | 477/181 X |
| 5,213,186 | 5/1993 | Murata .................................... | 477/169 |
| 5,417,622 | 5/1995 | Asayama et al. ......................... | 477/63 |
| 5,498,217 | 3/1996 | Maruyama et al. ................ | 477/181 X |
| 5,615,752 | 7/1997 | Wakahara et al. ...................... | 477/181 |

FOREIGN PATENT DOCUMENTS

| | | |
|---|---|---|
| 62-274157 | 11/1987 | Japan . |
| 3-71581 | 11/1991 | Japan . |
| 5-4542 | 1/1993 | Japan . |

*Primary Examiner*—Khoi Q. Ta
*Attorney, Agent, or Firm*—Oblon, Spivak, McClelland, Maier & Neustadt, P.C.

[57] ABSTRACT

An apparatus for controlling a releasing action of a lock-up clutch in a power transmitting system of a motor vehicle wherein the lock-up clutch is disposed between a pump impeller connected to an engine, and a turbine impeller operatively connected to a drive wheel of the motor vehicle, the lock-up clutch being engaged for direct connection of the pump impeller and the turbine impeller, the apparatus including a lock-up clutch switching device for effecting a releasing action of the lock-up clutch from a fully engaged state thereof to a fully released state thereof, and an engine output reducing device for temporarily reducing an output of the engine upon the releasing action of the lock-up clutch.

13 Claims, 22 Drawing Sheets

FIG. 3

| SHIFT POSITION | | S1 | S2 | C1 | C2 | B1 | B2 | F1 | B3 | F2 | C0 | F0 | B0 |
|---|---|---|---|---|---|---|---|---|---|---|---|---|---|
| P | | ⊗ | ⊗ | | | | | | | | ○ | | |
| R | | ⊗ | ⊗ | | ○ | | | | ○ | | ○ | | |
| N | | ⊗ | ⊗ | | | | | | | | ○ | | |
| D | 1st | ○ | × | ○ | | | | | | ○ | ○ | ○ | |
| D | 2nd | ○ | ○ | ○ | | | ○ | | | | ○ | ○ | |
| D | 3rd | × | ○ | ○ | ○ | | ○ | | | | ○ | ○ | |
| D | O/D | × | × | ○ | ○ | | ○ | | | | | | ○ |
| S | 1st | ○ | × | ○ | | | | | | ○ | ○ | ○ | |
| S | 2nd | ○ | ○ | ○ | | | ○ | ○ | | | ○ | ○ | |
| S | 3rd | × | ○ | ○ | ○ | | ○ | | | | ○ | ○ | |
| S | (O/D) | × | × | ○ | ○ | | ○ | | | | | | ○ |
| L | 1st | ○ | × | ○ | | | | | ○ | ○ | ○ | ○ | |
| L | 2nd | ○ | ○ | ○ | | ○ | ○ | ○ | | | ○ | ○ | |

APPARATUS FOR CONTROLLING VEHICLE LOCK-UP CLUTCH, WHEREIN ENGINE OUTPUT IS REDUCED UPON RELEASING ACTION OF LOCK-UP CLUTCH

This application is based on Japanese Patent Application No. 8-95076 filed Apr. 17, 1996, the content of which is incorporated hereinto by reference.

BACKGROUND OF THE INVENTION

1. Field of the Invention

The present invention relates to an apparatus for controlling a lock-up clutch used in a power transmitting system of a motor vehicle.

2. Discussion of the Related Art

In a motor vehicle having a fluid-filled power transmitting device equipped with a lock-up clutch such as a torque converter or fluid coupling incorporating such a lock-up clutch, there is proposed an apparatus for controlling the lock-up clutch, such that the lock-up clutch is fully engaged when a running condition of the vehicle falls in a predetermined fully engaging area, for the purpose of improving the fuel economy of the vehicle while minimizing the power loss. The running condition of the vehicle is represented in a two-dimensional coordinate system wherein a load of an engine of the vehicle is taken along one axis while a running speed of the vehicle is taken along another axis. The fully engaging area indicated above is suitably located within the two-dimensional coordinate system. An example of such a lock-up clutch control apparatus is disclosed in JP-A-62-274157 (published in 1987).

In the known lock-up clutch control apparatus of the type indicated above, the lock-up clutch may be switched from a fully engaged state into a fully released state when the vehicle running condition has changed to be outside the predetermined fully engaging area. That is, a pump impeller and a turbine impeller of the fluid-filled power transmitting device which have been directly connected to each other are rapidly disconnected or released from each other. Consequently, the torque transmitted from the engine to an automatic transmission through the lock-up clutch is temporarily rapidly reduced with a result of a change of the transmitted torque, irrespective of a manipulation of the vehicle by the operator of the vehicle. Such a torque change may cause a "releasing shock" of the vehicle, with which the vehicle operator is uncomfortable.

SUMMARY OF THE INVENTION

It is therefore an object of the present invention to provide an apparatus for controlling a lock-up clutch of a motor vehicle, which apparatus is less likely to suffer from the releasing shock indicated above.

The above object may be achieved according to the principle of the present invention, which provides an apparatus for controlling a releasing action of a lock-up clutch in a power transmitting system of a motor vehicle wherein the lock-up clutch is disposed between a pump impeller which receives a torque from an engine, and a turbine impeller which is operatively connected to a drive wheel of the motor vehicle, the lock-up clutch being engaged for direct connection of the pump impeller and the turbine impeller, the apparatus comprising: (a) lock-up clutch switching means for effecting a releasing action of the lock-up clutch from a fully engaged state thereof to a fully released state thereof; and (b) engine output reducing means for temporarily reducing an output of the engine upon the releasing action of the lock-up clutch.

In the lock-up clutch control apparatus of the present invention constructed as described above, the engine output reducing means temporarily reduces the output of the engine when the lock-up clutch is released to its fully released state by the lock-up clutch switching means. Consequently, the reduction of the torque to be transmitted to the turbine impeller upon releasing of the lock-up clutch takes place only after the output of the engine is reduced. In this arrangement, the amount of initial rapid reduction and the subsequent vibration of the transmitted torque due to the full releasing of the lock-up clutch are made smaller than in the arrangement in which the engine output is not reduced upon releasing of the lock-up clutch. Thus, the present arrangement is effective to minimize the "releasing shock" of the vehicle caused by the full releasing of the lock-up clutch.

In a first preferred form of the present invention, the engine output reducing means is adapted to initiate the reduction of the output of the engine before the lock-up clutch is brought to the fully released state by the lock-up clutch switching means. In this arrangement, the engine output reduction by the engine output reducing means and the consequent reduction of the torque to be transmitted to the lock-up clutch (pump impeller) are effected prior to the initiation of the reduction of the torque to be transmitted to the turbine impeller, which is caused by the full releasing of the lock-up clutch. Accordingly, the rate of the initial reduction of the transmitted torque and the subsequent vibration of the torque are suitably reduced or restricted, to effectively prevent the releasing shock of the lock-up clutch.

In one advantageous arrangement of the above first preferred form of the invention, the engine output reducing means reduces the output of the engine when a torque to be transmitted to the turbine impeller has a first peak following a rapid reduction of the torque due to the releasing action of the lock-up clutch. This arrangement is effective to reduce the vibration of the transmitted torque which occurs following the first peak of the torque, making it possible to prevent the releasing shock caused by the torque vibration upon releasing of the lock-up clutch.

In a second preferred form of the present invention, the apparatus further comprises lock-up clutch release determining means for determining whether the lock-up clutch should be fully released, on the basis of a running condition of the motor vehicle and according to a predetermined relationship between the running condition and an operating state of the lock-up clutch, and torque reduction delay time determining means for determining a torque reduction delay time on the basis of at least one of a temperature of a working oil for operating the lock-up clutch, a speed of the engine and a load of the engine. In this case, the engine output reducing means generates an engine output reducing command for reducing the output of the engine when a time lapse after a moment of determination by the lock-up clutch release determining means that the lock-up clutch should be fully released has reached the torque reduction delay time determined by the torque reduction delay time determining means. In this arrangement, the delay time is determined on the basis of at least one of the oil temperature of the lock-up clutch and the speed and load of the engine. That is, the delay time for determining the moment of generation of the engine output reducing command is determined depending upon the response of the lock-up clutch to the lock-up clutch releasing command and the response of the engine to the engine output reducing command. Accordingly, the engine output reduction is initiated at an optimum point of time for preventing the releasing shock of the lock-up clutch.

In one advantageous arrangement of the above second preferred form of the invention, the torque reduction delay time determining means is adapted to determine the torque reduction delay time on the basis of the temperature of the working oil and according to a predetermined relationship between the temperature and the torque reduction delay time, such that the torque reduction delay time increases with a decrease in the temperature. Since the releasing response of the lock-up clutch decreases with a decrease in the oil temperature, the engine output reduction by the engine output reducing means may take place a considerable time before the releasing of the lock-up clutch, when the oil temperature is comparatively low. However, the present arrangement is effective to prevent this drawback, since the torque reduction delay time is increased as the oil temperature is lowered.

In another advantageous arrangement of the second preferred form of the invention, the torque reduction delay time determining means is adapted to determine the torque reduction delay time on the basis of at least one of the speed and the load of the engine and according to a predetermined relationship between the torque reduction delay time and the at least one of the speed and the load of the engine, such that the torque reduction delay time increases with an increase in the at least one of the speed and the load of the engine. The engine load may be represented by an opening angle of a throttle valve of the engine, an amount of fuel injection into the engine, or an intake air quantity of the engine. As the engine speed or engine load increases, the time required for the output reduction of the engine to provide an intended effect of reducing the torque transmitted to the lock-up clutch is shortened. In view of this tendency, the torque reduction delay time is determined so that the engine output reduction by the engine output reducing means does not provide the torque reducing effect a considerable time before the occurrence of the full releasing of the lock-up clutch.

In a third preferred form of this invention, the apparatus further comprises: lock-up clutch release determining means for determining whether the lock-up clutch should be fully released, on the basis of a running condition of the motor vehicle and according to a predetermined relationship between the running condition and an operating state of the lock-up clutch; and lock-up clutch releasing delay time determining means for determining a lock-up clutch releasing delay time on the basis of at least one of a temperature of a working oil for operating the lock-up clutch, a speed of the engine and a load of the engine. In this instance, the lock-up clutch switching means is adapted to generate a lock-up clutch releasing command for fully releasing the lock-up clutch when a time lapse after a moment of determination by the lock-up clutch release determining means that the lock-up clutch should be fully released has reached the lock-up clutch releasing delay time determined by the lock-up clutch releasing delay time determining means. In this arrangement, the lock-up clutch releasing delay time is determined on the basis of at least one of the oil temperature of the lock-up clutch and the speed and load of the engine. That is, the delay time for determining the moment of generation of the lock-up clutch releasing command is determined depending upon the releasing response of the lock-up clutch and the output reduction response of the engine. Accordingly, the lock-up clutch is fully released at an optimum point of time for preventing the releasing shock of the lock-up clutch.

In one advantageous arrangement of the above third preferred form of the invention, the lock-up clutch releasing delay time determining means is adapted to determine the lock-up clutch releasing delay time on the basis of the temperature of the working oil and according to a predetermined relationship between the temperature and the lock-up clutch releasing delay time, such that the lock-up clutch releasing delay time increases with an increase in the temperature. Since the response of the lock-up clutch to the lock-up clutch releasing command increases with an increase in the oil temperature, the fully releasing of the lock-up clutch by the lock-up clutch switching means may take place a considerable time before the engine output reduction by the engine output reducing means, when the oil temperature is comparatively high. However, the present arrangement is effective to prevent this drawback, since the lock-up clutch releasing delay time is increased as the oil temperature is raised.

In a second advantageous arrangement of the third preferred form of the invention, the lock-up clutch releasing delay time determining means is adapted to determine the lock-up releasing delay time on the basis of at least one of the speed and the load of the engine and according to a predetermined relationship between the lock-up clutch releasing delay time and the at least one of the speed and the load of the engine, such that the lock-up clutch releasing delay time decreases with an increase in the at least one of the speed and the load of the engine. As described above, the engine load may be represented by an opening angle of a throttle valve of the engine, an amount of fuel injection into the engine, or an intake air quantity of the engine. As the engine speed or engine load increases, the time required for the output reduction of the engine to provide an intended effect of reducing the torque transmitted to the lock-up clutch is shortened. In view of this tendency, the lock-up clutch releasing delay time is determined so that the engine output reduction by the engine output reducing means does not provide the torque reducing effect a considerable time before the occurrence of the full releasing of the lock-up clutch.

According to a fourth preferred form of this invention, the apparatus further comprises positive torque determining means for determining whether the motor vehicle is in a positive torque drive state in which a torque is transmitted from the engine to the drive wheel and wherein the engine output reducing means reduces the output of the engine when the positive torque determining means determines that the motor vehicle is in the positive torque drive state. In other words, the engine output reducing means does not reduce the engine output when the vehicle is in a negative torque drive state in which a torque is transmitted from the drive wheel to the engine. In the negative torque drive state, the problem of rapid reduction of the torque transmitted to the turbine impeller upon full releasing of the lock-up clutch is unlikely to occur. Thus, the present arrangement is effective to avoid unnecessary reduction of the engine output by the engine output reducing means. In this respect, it is noted the the problem of the releasing shock due to the rapid reduction of the torque upon releasing of the lock-up clutch is likely to occur when the accelerator pedal is depressed while the lock-up clutch is in the fully engaged state.

In a further preferred form of the present invention, the lock-up clutch switching means is adapted to effect the releasing action of the lock-up clutch such that the releasing action takes place in synchronization with an ignition timing of the engine. The engine output reducing means may be adapted to reduce the engine output by retarding the ignition timing of the engine, by reducing the number of the effective cylinders of the engine, or by reducing the amount of the air-fuel mixture to the engine or the amount of fuel injection into the engine. The reduction of the engine output by the engine output reducing means is initiated at the first ignition of the engine after the generation of the engine output reducing means. In the present form of the invention in which the releasing action of the lock-up clutch takes place in synchronization with the ignition timing of the engine, the engine output reduction and the releasing action of the lock-up clutch occur concurrently upon ignition of the engine, so that the torque to be transmitted to the lock-up clutch upon releasing of the lock-up clutch can be suitably controlled so as to assure a smooth change of the torque to be transmitted to the turbine impeller, even in the presence of some variation in the point of time at which the lock-up clutch release determining means determines that the lock-up clutch should be fully released.

BRIEF DESCRIPTION OF THE DRAWINGS

The above and optional objects, features, advantages and technical significance of the present invention will be better understood by reading the following detailed description of presently preferred embodiments of the invention, when considered in conjunction of the accompanying drawings, in which:

FIG. 3 is a table indicating a relationship between the operating positions of an automatic transmission connected to the torque converter and the respective combinations of the operating states of first and second solenoid-operated valves of the slip control apparatus;

DETAILED DESCRIPTION OF THE PREFERRED EMBODIMENTS

Figure 1:
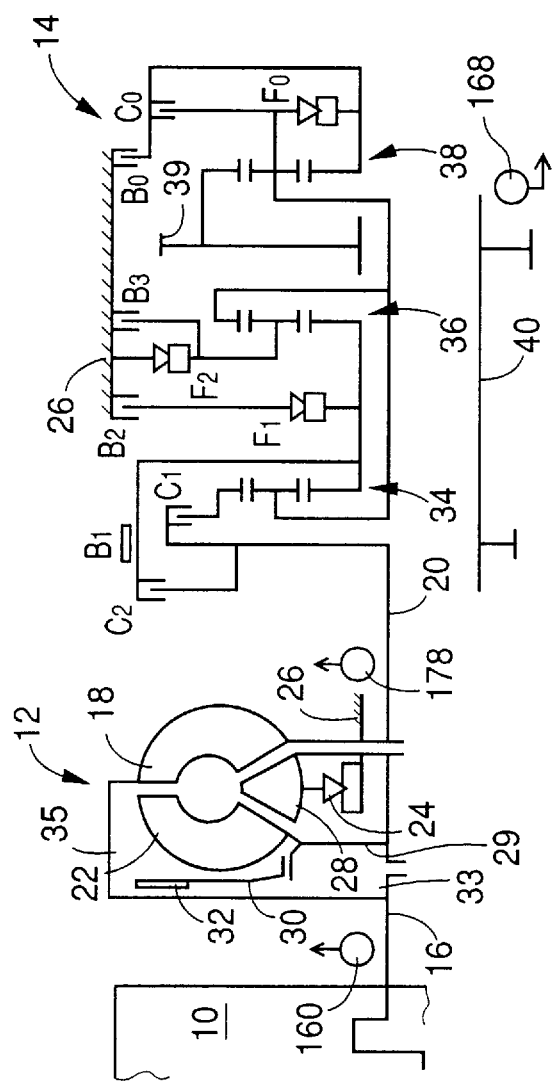
FIG. 1 is a schematic view illustrating a part of a power transmitting system of a motor vehicle, which incorporates a torque converter having a lock-up clutch to be controlled by a control apparatus constructed according to one embodiment of the present invention.

Referring first to the schematic view of FIG. 1, there is shown a part of a power transmitting system of a motor vehicle, wherein power generated by an engine 10 is transmitted to a differential gear device and drive wheels through a torque converter 12 equipped with a lock-up clutch 32, and an automatic transmission 14 which includes three planetary gear sets to selectively establish a plurality of operating positions (gear positions).

Figure 2:
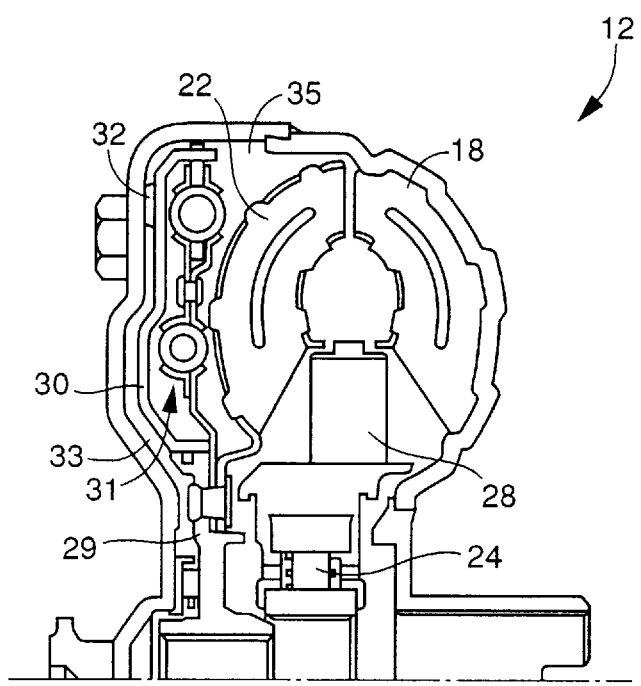
FIG. 2 is a fragmentary view in cross section showing in detail the torque converter having the lock-up clutch.

As shown in detail in FIG. 2, the torque converter 12 includes; a pump impeller 18 connected to a crankshaft 16 of the engine 10; a turbine impeller 22 fixed to an input shaft of the automatic transmission 14 and rotatable by the pump impeller 18; a stator impeller 28 fixed to a stationary member in the form of a housing 26 through a one-way clutch 24; and the above-indicated lock-up clutch 32 connected to the input shaft 20 through the turbine impeller 22. The pump impeller 18 includes a radially outer portion which is U-shaped in cross section, and a plurality of curved vanes which are arranged in the circumferential direction and formed so as to cause a flow of a working oil, which flow includes a component moving toward the turbine impeller 22 on the side of the engine 10. The turbine impeller 22 includes a plurality of curved vanes opposed to the vanes of the pump impeller 18. In operation of the torque converter 12, the turbine impeller 22 is rotated by the oil flow from the vanes of the pump impeller 18 rotated by the engine 10. The lock-up clutch 32 includes a piston 30 which engages a hub 29 of the turbine impeller 22 such that the piston 30 is axially slidable relative to and rotatable with the hub 29. The lock-up clutch 32 is connected through a damper 31 to the input shaft 30. The damper 31 connects the piston to the hub 29 such that the damper permits the piston 30 to be rotated relative to the hub 29 over a predetermined angular range so as to provide a damping effect between the piston 30 and the hub 29.

The piston 30 of the lock-up clutch 32 divides an interior of the torque converter 12 into two oil chambers 33 and 35. The lock-up clutch 32 is released and engaged by axial movements of the piston 32 depending upon a difference between oil pressures in these two oil chambers 33, 35, which will be hereinafter referred to as a releasing oil chamber 33 and an engaging oil chamber 35, respectively. Described more specifically, the piston 30 is retracted to its fully retracted position when the pressure in the releasing oil chamber 33 is increased while the engaging oil chamber 35 is drained. When the pressure in the engaging oil chamber 35 is increased while the releasing oil chamber 33 is held at the lowest level, the piston 30 is advanced to its fully advanced position. In the fully retracted position of the piston 30, the lock-up clutch 32 is placed in its fully released position in which the torque received by the pump impeller 18 is amplified or boosted at a ratio depending upon the ratio of the input and output speeds of the torque converter 12. In the fully advanced position of the piston 30, the lock-up clutch 32 is placed in the fully engaged position in which the frictional coupling portion of the clutch 32 is forced against the radially outer U-shaped portion of the pump impeller 18, whereby the pump impeller 18 is directly connected to the input shaft 20, that is, the crankshaft 16 as an input member of the torque converter 12 is directly connected to the input shaft 20 of the transmission 14, which serves as an output member of the torque converter 12. When the pressure in the releasing oil chamber 33 is increased to a predetermined level while the pressure in the engaging oil chamber 35 is held at a higher level, the piston 30 is advanced to a predetermined position in which the frictional coupling portion of the lock-up clutch is located near the corresponding coupling portion (radially outer U-shaped portion) of the pump impeller 18.

The automatic transmission 14 includes: the input shaft 20, a first, a second and a third planetary gear set 34, 36, 38; an output gear 39 which rotates with a ring gear of the third planetary gear set 38; and an output shaft in the form of a counter shaft 40 which connects the output gear 39 and the differential gear device. The planetary gear sets 34, 36, 38 include components which are connected integrally with each other, and components which are connected to each other when three clutches C0, C1, C2 are selectively engaged. The planetary gear sets 34, 36, 38 also include components which are fixed or connected to the housing 26 and thereby inhibited from rotating when four brakes B0, B1, B2, B3 are selectively engaged. The planetary gear sets 34, 36, 38 further include components which are connected to each other or to the housing 26 through three one-way clutches F0, F1, F2, depending upon the rotating directions of the components.

Each of the clutches C0, C1, C2 and brakes B0, B1, B2, B3 may consist of a multiple-disk clutch, or a band brake which uses two bands wound in opposite directions. These clutches and brakes are operated by respective hydraulically operated actuators, which are controlled by an electronic transmission controller 184 shown in FIG. 4 (which will be described), so as to selectively establish a plurality of operating positions of the automatic transmission 14. That. is, the automatic transmission 14 has four forward drive positions, first-speed ("1st"), second-speed ("2nd"), third-speed ("3rd") and overdrive ("O/D") positions, and one backward drive position "R", as indicated in FIG. 3. The four forward drive positions "1st", "2nd", "3rd" and "O/D" have respective different speed ratios I which decrease in the order of description. The speed ratio I is defined as the speed of the input shaft 20 divided by the speed of the counter shaft (output shaft) 40.

It is to be noted that the lower halves of the torque converter 12 and automatic transmission 14 and the upper half of the counter shaft 40 are not shown in FIGS. 1 and 2 in the interest of simplification, since these elements 12, 14, 40 are symmetrical with respect to their axes of rotation.

Referring next to the block diagram of FIG. 4, there will be described a control system provided to control the engine 10, lock-up clutch 32 and automatic transmission 14 of the motor vehicle. The control system includes the electronic transmission controller 184 indicated above, which is adapted to control a hydraulic control device 44. The hydraulic control device 44 includes a transmission control circuit for shifting the automatic transmission 14 to an appropriate one of the operating positions, and a lock-up clutch control circuit for controlling the operating state of the lock-up clutch 32. The transmission control circuit is provided with a first and a second solenoid-operated valve S1, S2, which have respective solenoid coils. The clutches C0, C1, C2 and brakes B0, B1, B2, B3 are selectively engaged to selectively establish the operating positions ("1st", "2nd", "3rd" and "O/D") of the transmission 14, depending upon respective combinations of the operating states of the first and second solenoid-operated valves S1, S2, as indicated in FIG. 3. In this figure, "o" indicates the energization of the solenoid coils of the valves S1, S2 or the engagement of the clutches and brakes.

Figure 5:
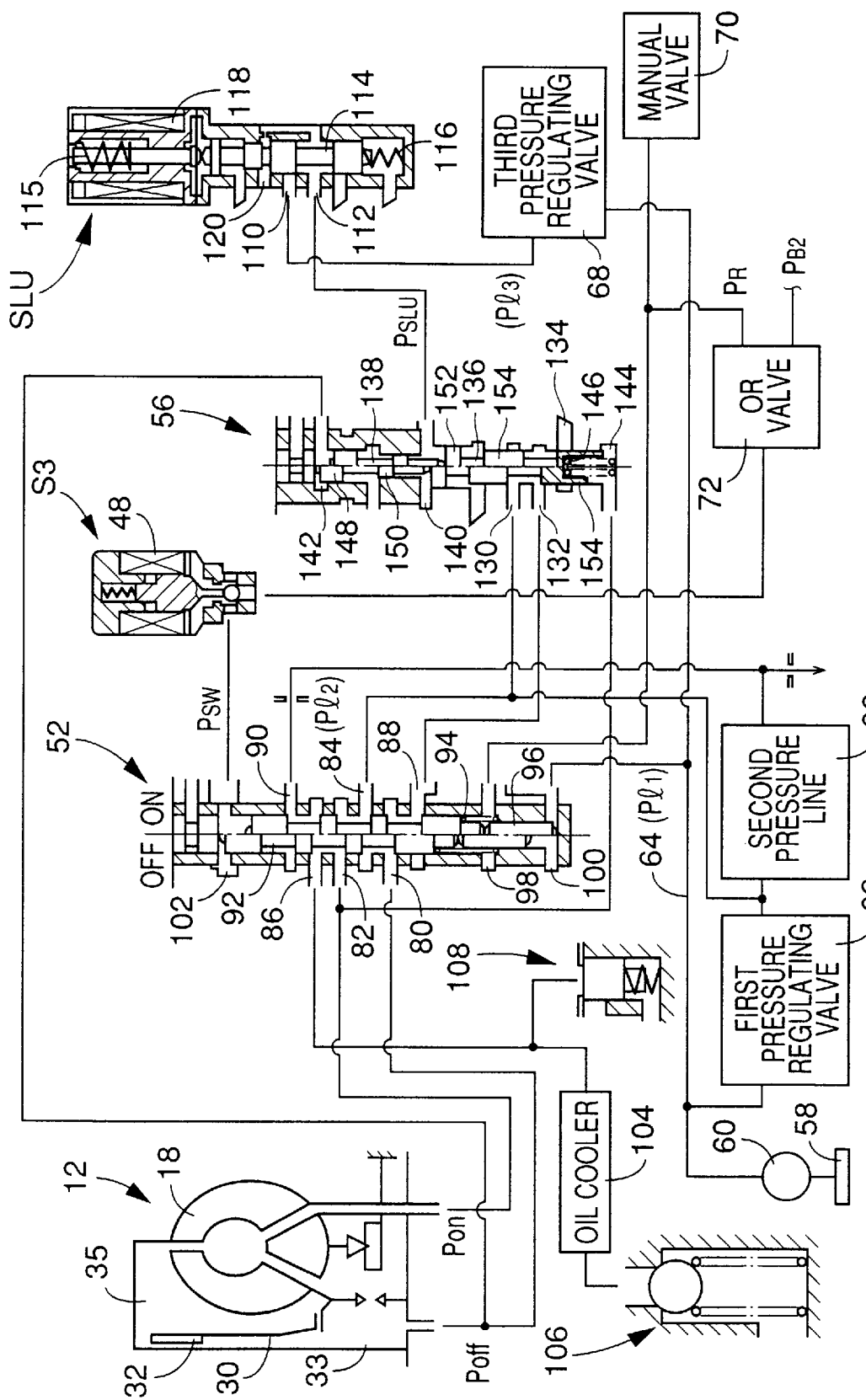
FIG. 5 is a view illustrating a part of a hydraulic control device shown in FIG. 4, which incorporates a circuit for controlling the lock-up clutch.

The lock-up clutch control circuit of the hydraulic control device 44 includes a third solenoid-operated valve S3, a lock-up relay valve 52, a linear solenoid valve SLU, and a lock-up clutch control valve 56, as shown in FIG. 5. The third solenoid-operated valve S3 has a solenoid coil 48 which is turned on and off. When the coil 48 is on, the valve 53 generates a LOCK-UP SWITCHING pressure $P_{SW}$. The lock-up relay valve 52 has a releasing state and an engaging state for releasing and engaging the lock-up clutch 32, respectively, depending upon whether the pilot pressure $P_{SW}$ is generated by the valve S3. The linear solenoid valve SLU is adapted to generate a SLIP CONTROL pilot pressure $P_{SLU}$ corresponding to a SLIP CONTROL current $I_{SLU}$ supplied from the transmission controller 184. The lock-up clutch control valve 56 is adapted to regulate a pressure difference $\Delta P$ between the pressures in the engaging and releasing oil chambers 35, 33 of the torque converter 12, according to the SLIP CONTROL pilot pressure $P_{SLU}$ received from the linear solenoid valve SLU, for thereby controlling an amount of slip of the lock-up clutch 32.

As shown in FIG. 5, the hydraulic control device 44 includes a pump 60 for pressuring a working oil sucked from a suitable reservoir through a strainer 58. The pump 60 is driven by the engine 10. The pressure of the oil delivered by the pump 60 is adjusted to a first line pressure Pl1 by a first pressure regulating valve 62 of an overflow type. The first pressure regulating valve 62 is arranged to receive a THROTTLE pilot pressure indicative of an opening TA of a first throttle valve 166 (FIG. 3), and regulate the first line pressure Pl1 in a first pressure line 64 such that the pressure Pl1 increases with the THROTTLE pilot pressure. The hydraulic control device 44 further has a second pressure regulating valve 66 of an overflow type, which is adapted to regulate the pressure of the oil received from the first pressure regulating valve 62, to a second line pressure Pl2 according to the THROTTLE pressure, so that the second line pressure Pl2 corresponds to the output torque of the engine 10. The device 44 further has a third pressure regulating valve 68, which is a pressure reducing valve adapted to reduce the first line pressure Pl1 to a predetermined third line pressure Pl3.

The motor vehicle has a shift lever 174 (FIG. 4) which has six operating positions "P" (PARKING), "R" (REVERSE), "N" (NEUTRAL), "D" (DRIVE), "S" (SECOND) and "L" (LOW), as indicated in FIG. 3. The hydraulic control device 44 includes a manual valve 70 (FIG. 5) adapted to generate a REVERSE pressure $P_R$ when the shift lever 174 is placed in the REVERSE position "R" (which is the backward drive position referred to above with respect to the automatic transmission 14). The device 44 also includes an OR valve 72 which is adapted to generate a higher one of a BRAKE B2 pressure $P_{B2}$ and the REVERSE pressure $P_R$, which serves as the LOCK-UP SWITCHING pilot pressure $P_{SW}$ generated when the valve S3 is turned ON as explained below in detail. The BRAKE B2 pressure $P_{B2}$ is generated to engage the brake B2 for establishing the second-speed ("2nd"), third-speed ("3rd") and overdrive ("O/D") positions.

The lock-up relay valve 52 has: a releasing port 80 communicating with the releasing oil chamber 33; an engaging port 82 communicating with the engaging oil chamber 35; an input port 84 adapted to receive the second line pressure Pl2; a first drain port 86 through which the oil in the engaging oil chamber 35 is discharged when the lock-up clutch 32 is released; a second drain port 88 through which the oil in the releasing oil chamber 33 is discharged when the lock-up clutch 32 is engaged; a supply port 90 adapted to receive the oil discharged from the second pressure regulating valve 66 so that the oil is cooled during engagement of the lock-up clutch 32; a spool 92 operable between an ON position and an OFF position, for switching the mutual communication or connection of the ports indicated above; a spring 94 for biasing the spool 92 toward the OFF position; a plunger 96 abuttable on the end of the spool 92 on the side of the spring 94; an oil chamber 98 defined between the above-indicated end of the spool 92 and the opposed end of the plunger 96, and adapted to receive the REVERSE pressure $P_R$ from the manual valve 70; an oil chamber 100 partially defined by the other end of the plunger 96 and adapted to receive the first line pressure Pl1; and an oil chamber 102 partially defined by the other end of the spool 92 and adapted to receive the LOCK-UP SWITCHING pressure $P_{SW}$ from the third solenoid-operated valve S3, for generating a thrust force for moving the spool 92 toward the ON position.

The third solenoid-operated valve S3 has a ball which is seated on a valve seat to disconnect a line communicating with the oil chamber 102 of the lock-up relay valve 52 and the OR valve 72 when the solenoid coil 48 is de-energized or OFF. In this state, the LOCK-UP SWITCHING pilot pressure $P_{SW}$ is not applied to the oil chamber 102. When the coil 48 is energized or ON, the ball is unseated to permit the communication between the OR valve 72 and the oil chamber 102, whereby the LOCK-UP SWITCHING pressure $P_{SW}$ is applied to the oil chamber 102. In the OFF state of the valve S3, therefore, the spool 92 of the lock-up relay valve 52 is moved to its OFF position by the biasing force of the spring 94 and a force based on the first line pressure Pl1 in the oil chamber 100, whereby the input port 84 communicates with the releasing port 80 while the first drain port 86 communicates with the engaging port 82. As a result, a pressure Poff in the releasing oil chamber 33 is made higher than a pressure Pon in the engaging oil chamber 35, to thereby release the lock-up clutch 32, while at the same time the engaging chamber 35 is drained through the first drain port 86, an oil cooler 104 and a check valve 106.

In the ON state of the valve S3, on the other hand, the LOCK-UP SWITCHING pilot pressure $P_{SW}$ is applied to the oil chamber 102, and the spool 92 is moved by a force based on the pressure $P_{SW}$, against the biasing force of the spring 94 and the force based on the first line pressure Pl1 in the oil chamber 100, whereby the input port 84 communicates with the engaging port 82 while the first and second drain ports 86, 88 communicate with the supply and releasing ports 90, 80, respectively. As a result, the pressure Pon in the engaging oil chamber 35 is made higher than the pressure Poff in the releasing oil chamber 33, to thereby engage the lock-up clutch 32, while at the same time the releasing oil chamber 33 is drained through the second drain port 88 and the lock-up clutch control valve 56.

The linear solenoid valve SLU is a reducing valve adapted to reduce the predetermined third line pressure Pl3 to the SLIP CONTROL pilot pressure $P_{SLU}$, such that the pilot pressure $P_{SLU}$ increases with an increase in the SLIP CONTROL current $I_{SLU}$ supplied from the transmission controller 184, namely, increases with an increase in a duty ratio $D_{SLU}$ of the linear solenoid valve SLU. The thus controlled pilot pressure $P_{SLU}$ is applied to the lock-up clutch control valve 56. The linear solenoid valve SLU has: a supply port 110 adapted to receive the third line pressure Pl3; an output port 112 from which the SLIP CONTROL pilot pressure $P_{SLU}$ is applied to the valve 56; a spool 114 for closing and opening the ports 110, 112; a spring 115 for biasing the spool 114 in a valve closing direction; a spring 116 for biasing the spool 114 in a valve opening direction by a force smaller than that of the spring 115; a solenoid coil 118 for biasing the spool 114 in the valve opening direction by a force determined by the SLIP CONTROL current $I_{SLU}$; and an oil chamber 120 adapted to receive a feedback pressure (SLIP CONTROL pilot pressure $P_{SLU}$) which biases the spool 114 in the valve closing direction. The spool 114 is moved to a position of equilibrium between a sum of the biasing forces of the solenoid coil 118 and the spring 116 and a sum of the biasing force of the spring 115 and a force based on the feedback pressure $P_{SLU}$.

The lock-up clutch control valve 56 has: a line pressure port 130 adapted to receive the second line pressure Pl2; an input port 132 adapted to receive the oil discharged from the releasing oil chamber 33 through second drain port 88 of the valve 52; a drain port 134 through which the oil received by the input port 132 is discharged; a spool 136 operable between a first position (indicated at left in FIG. 5) and a second position (indicated at right in FIG. 4); a plunger 138 abuttable on the spool 136 for biasing the spool 136 toward the first position; an oil chamber 140 adapted to receive the SLIP CONTROL pilot pressure $P_{SLU}$ for biasing the plunger 138 so as to generate a thrust force which biases the spool 136 toward the first position; an oil chamber 142 adapted to receive the oil pressure Poff in the releasing oil chamber 33, for biasing the plunger 138 so as to generate a thrust force which biases the spool 136 toward the first position; an oil chamber 144 adapted to receive the oil pressure Pon in the engaging oil chamber 35, for generating a thrust force for biasing the spool 136 toward the second position; and a spring 146 received in the oil chamber 144, for biasing the spool 136 toward the second position.

In the first position of the spool 136 of the lock-up clutch control valve 56, the input port 132 communicates with the drain port 134 to cause the releasing oil chamber 33 to be drained, for thereby increasing the pressure difference ΔP (=Pon−Poff) of the oil chambers 33, 35. In the second position of the spool 136, the input port 132 communicates with the line pressure port 130 to cause the second line pressure Pl2 to be applied to the releasing oil chamber 33, for thereby reducing the pressure difference ΔP.

Figure 6:
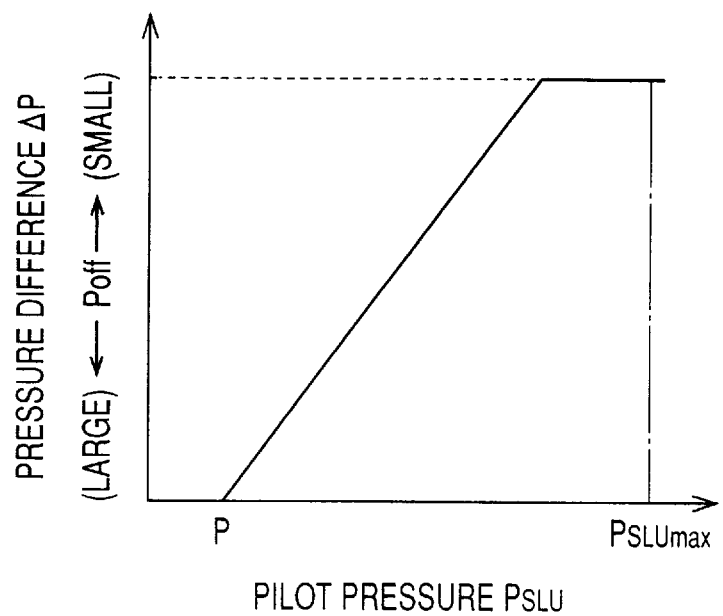
FIG. 6 is a graph indicating an output characteristic of a lock-up clutch control valve provided in a lock-up clutch control circuit of FIG. 4, namely, a relationship between a pilot pressure $P_{SLU}$ received by the lock-up clutch control valve and a pressure difference $\Delta P$ of engaging and releasing oil chambers of the lock-up clutch.

The plunger 138 has a first land 148 adjacent to the oil chamber 142, and a second land 150 remote from the oil chamber 142. The first land 148 has a cross sectional area A1, and the second land 150 has a cross sectional area A2 larger than the area A1. The spool 136 has a third land 152 adjacent to the pilot pressure oil chamber 140, and a fourth land 154 remote from the oil chamber 140. The third land 152 has a cross sectional area A3, and the fourth land 154 has a cross sectional area equal to the cross sectional area A1. In this arrangement of the lock-up clutch control valve 56, the plunger 138 and the spool 136 are moved together as a unit with the plunger 138 held in abutting contact with the spool 136. With the movement of the plunger and spool 138, 136, the pressure difference ΔP (=Pon−Poff) on the opposite sides of the piston 30 of the lock-up clutch 32 is controlled depending upon the SLIP CONTROL pilot pressure $P_{SLU}$ generated by the linear solenoid valve SLU. The pressure difference ΔP changes with the pilot pressure $P_{SLU}$ as shown in FIG. 6, at a rate or gradient represented by a value (A2−A1)/A1.

Figure 4:
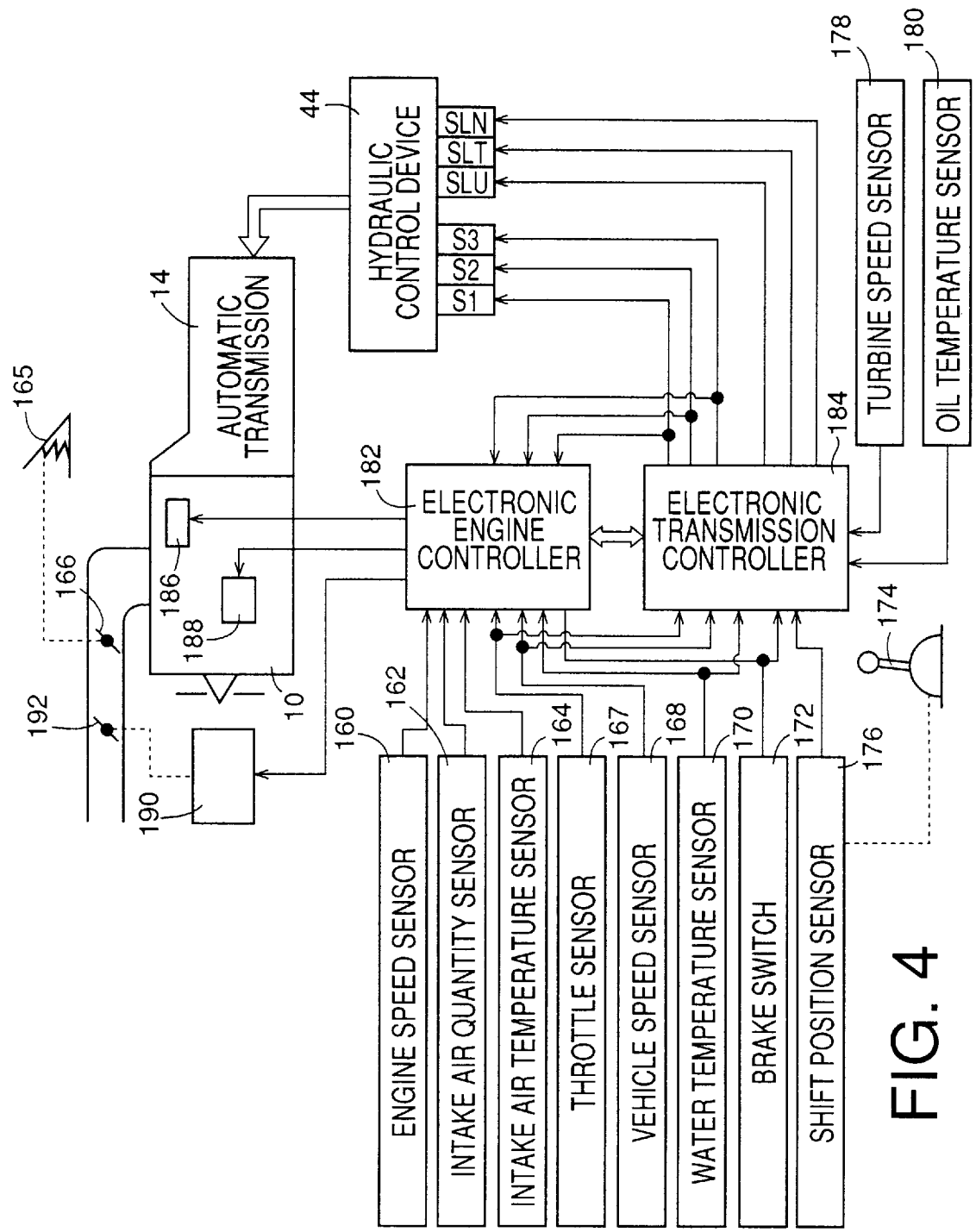
FIG. 4 is a block diagram showing a control system for the motor vehicle, which includes an electronic transmission controller incorporating the lock-up clutch control apparatus.

Referring back to the block diagram of FIG. 4, the motor vehicle has various sensors and switches including: an engine speed sensor 160 for detecting the speed $N_E$ of the engine 10, that is, speed $N_P$ of the pump impeller 18; an intake air quantity sensor 162 for detecting a quantity Q of an intake air sucked into the engine 10 through an intake pipe; an intake air temperature sensor 164 for detecting a temperature $T_{AIR}$ of the intake air; a throttle sensor 167 for detecting the opening TA of the first throttle valve 166 operated by an accelerator pedal 165, the throttle sensor 167 being equipped with an idling position switch for detecting the idling position of the throttle valve 166; a vehicle speed sensor 168 for detecting a running speed V of the vehicle on the basis of a speed Nout of the output shaft 40 of the automatic transmission 40; a water temperature sensor 170 for detecting a temperature $T_{WA}$ of a coolant water of the engine 10; a brake switch 172 for detecting an operation of a brake pedal; a shift position sensor 176 for detecting a currently selected operating position Ps of the automatic transmission 40, namely, a currently selected one of the operating positions "L", "S", "D", "N", "R" and "P" of the shift lever 174; a turbine speed sensor 178 for detecting the speed $N_T$ of the turbine impeller 22, that is, the speed Nin of the input shaft 20 of the transmission 20; and an oil temperature sensor 180 for detecting a temperature $T_{OIL}$ of the working oil in the hydraulic control device 44. The output signals generated by the above sensors and switch are applied directly or indirectly to an electronic engine controller 182 and the electronic transmission controller 184. The two controllers 182, 184 are connected to each other by a communication interface, for applying the necessary signals to each other.

The transmission controller 184 is comprised of a so-called microcomputer incorporating a central processing unit (CPU), a read-only memory (ROM), a random-access memory (RAM) and an interface. The CPU processes the input signals according to various control programs stored in the ROM, while utilizing a temporary data storage function of the RAM, for controlling the automatic transmission 14 and the lock-up clutch 32 by controlling the first, second and third solenoid-operated valves S1, S2, S3 and the linear solenoid valve SLU.

Figure 7:
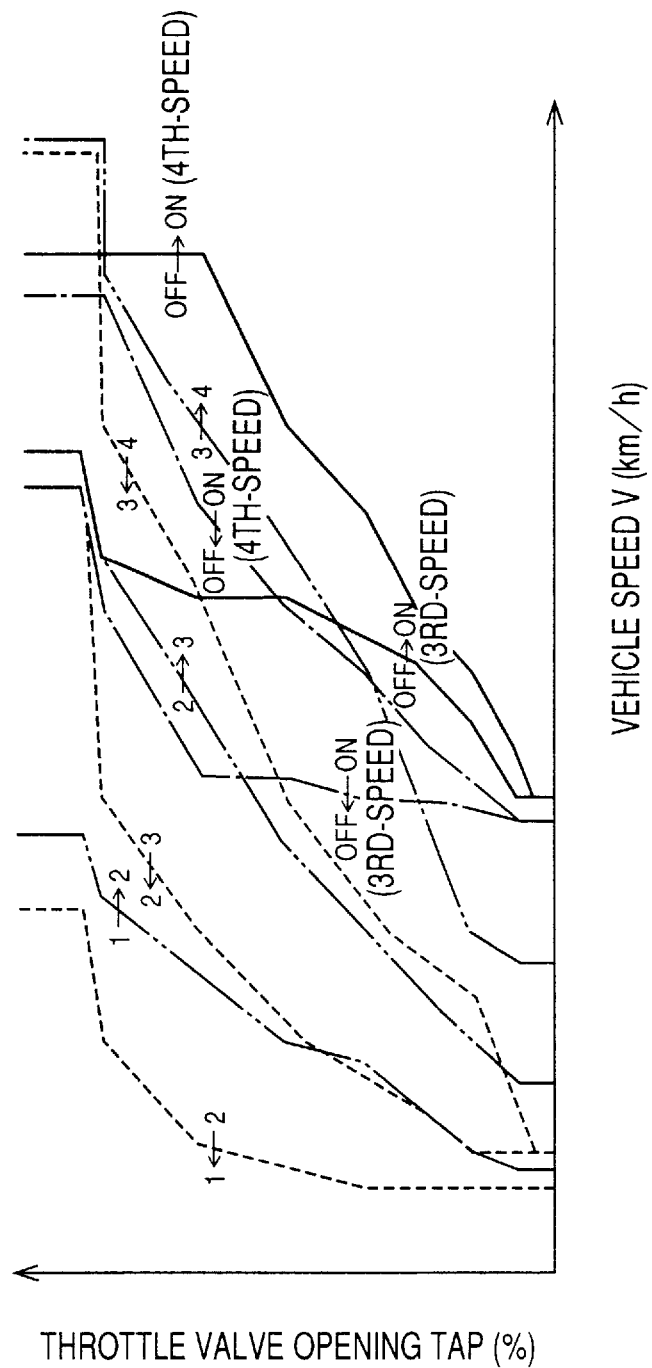
FIG. 7 is a graph showing shift patterns for shifting the automatic transmission, and ON-OFF boundary lines for fully engaging and releasing the lock-up clutch, which shift patterns and boundary lines are stored in a ROM of the electronic transmission controller of FIG. 4.

For controlling the automatic transmission 14 so as to shift the transmission 14 to the appropriate operating position, a plurality of shift patterns as indicated in FIG. 7 are stored in the ROM, and one of the shift patterns which corresponds to the currently selected position of the transmission 14 is selected to determine the operating position (one of the four forward drive positions) to which the transmission 14 should be shifted down or up. For instance, each shift pattern consists of a shift-down boundary line and a shift-up boundary line which are relationships between the throttle valve opening TA and the vehicle speed V. On the basis of the determined forward drive position to which the transmission 14 should be shifted, the solenoid-operated valves S1 and S2 are suitably controlled (with their solenoid coils being suitably energized or de-energized), so as to establish an appropriate combination of the operating states of the clutches and brakes C0, C1, C2, B0, B1, B2, B3, which combination corresponds to the determined forward drive position.

Figure 8:
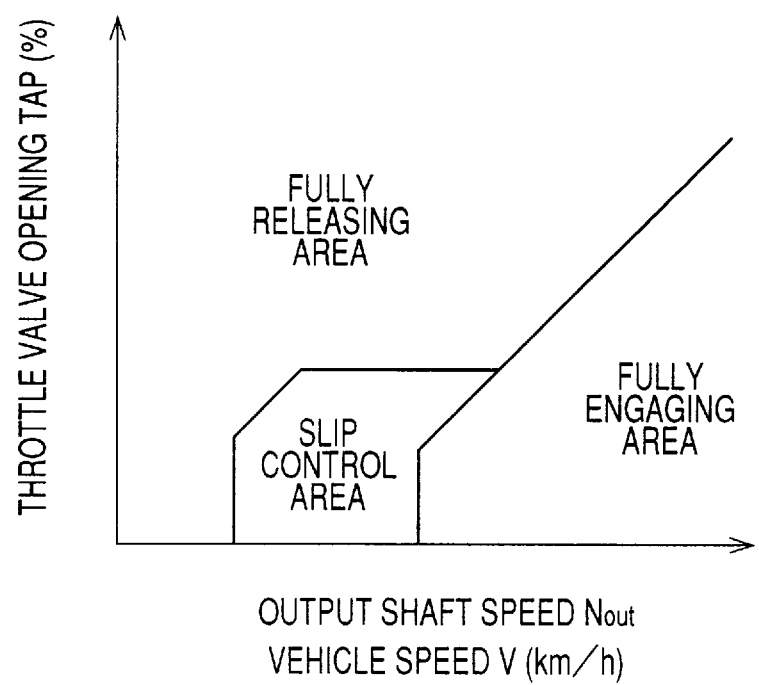
FIG. 8 is a view indicating boundaries defining different control areas of the lock-up clutch in relation to the running condition of the vehicle, which boundaries are stored in the slip control apparatus shown in FIG. 3.

The transmission controller 184 is adapted to control the lock-up clutch 32 in the manner explained below, when the vehicle is running with the transmission 14 placed in the third-speed or fourth-speed or overdrive position ("3rd" or "O/D"), for example. For controlling the lock-up clutch 32 differently depending upon the running condition of the vehicle, predetermined boundaries defining three different control areas as indicated in FIG. 8 are stored in the ROM. For instance, the boundaries are relationships between the throttle valve opening TA and the output speed Nout of the output shaft 40 of the transmission 14 (vehicle speed V). Described more specifically, these boundaries define a fully releasing area in which the lock-up clutch 32 should be fully released, a fully engaging area in which the clutch 32 should be fully engaged, and a slip control area in which the amount of slip of the clutch 32 should be suitably controlled according to the principle of the present invention as described below in detail. Depending upon the currently detected throttle opening TA and output speed Nout, one of the three control areas is determined or selected by the CPU of the transmission controller 184, according to the boundaries stored in the ROM. When the vehicle running condition (TA and Nout) is in the slip control area, the lock-up clutch 32 is controlled to be held in a slipping state for transmitting power of the engine 10 to the automatic transmission 14 so as to maximize the fuel economy of the vehicle while absorbing a torque variation of the engine 10 to assure high power transmission stability and improved running stability or comfort of the vehicle.

If the CPU of the controller 184 determines that the vehicle running condition falls in the fully engaging area, the solenoid coil of the third solenoid-operated valve S3 is energized to turn ON the lock-up relay valve 52, and the SLIP CONTROL current $I_{SLU}$ applied to the linear solenoid valve SLU is reduced to the minimum value, whereby the lock-up clutch 32 is fully engaged. If the vehicle running condition is determined to be in the fully releasing area, the solenoid coil of the valve S3 is de-energized to turn OFF the lock-up relay valve 52, so that the lock-up clutch 32 is fully released irrespective of the SLIP CONTROL current $I_{SLU}$. If the vehicle running condition is determined to be in the slip control area, the solenoid coil of the valve S3 is energized to turn ON the lock-up relay valve 52, and the SLIP CONTROL current $I_{SLU}$ to be applied to the valve SLU is adjusted so as to zero or eliminate an error $\Delta E$ (=$N_{SLP}$-TNSLPBD) between a transient target slip speed TNSLPBD and the actual slip speed $N_{SLP}$ (=$N_E$-$N_T$) of the lock-up clutch 32. The SLIP CONTROL current $I_{SLU}$ is calculated according to a predetermined suitable equation stored in the ROM of the transmission controller 184.

The electronic engine controller 182 is comprised of a microcomputer similar to that of the transmission controller 184, which has a CPU adapted to process the input signals according to programs stored in a ROM while utilizing a temporary data storage function of a RAM, for controlling the engine 10, more specifically, for effecting a fuel injection control for controlling a fuel injection valve 186 so as to optimize the combustion condition of the engine 10, an ignition control for controlling an ignitor 188 so as to optimize the ignition timing, a traction control for controlling a second throttle valve 192 via a throttle actuator 190 so as to control the traction force of the vehicle while preventing slipping of the drive wheels on the road surface, and a fuel-cut control for holding the fuel injection valve 186 closed while the engine speed $N_E$ is higher than a predetermined fuel-cut threshold level $N_{CUT}$ during coasting of the vehicle. The engine controller 182 is also adapted to effect an engine output reduction control for controlling the fuel injection valve 186, second throttle valve 192 or ignitor 188, according to a command received from the transmission controller 184, so as to temporarily reduce the output of the engine 10. Namely, the output of the engine 10 can be temporarily reduced by controlling the fuel injection valve 186 to temporarily reduce the amount of fuel injection, by temporarily closing the second throttle valve 192 by a suitable amount so as to reduce the air-fuel mixture to be supplied to the engine 10, or by controlling the ignitor 188 so as to temporarily retard the ignition timing by a suitable amount.

Figure 9:
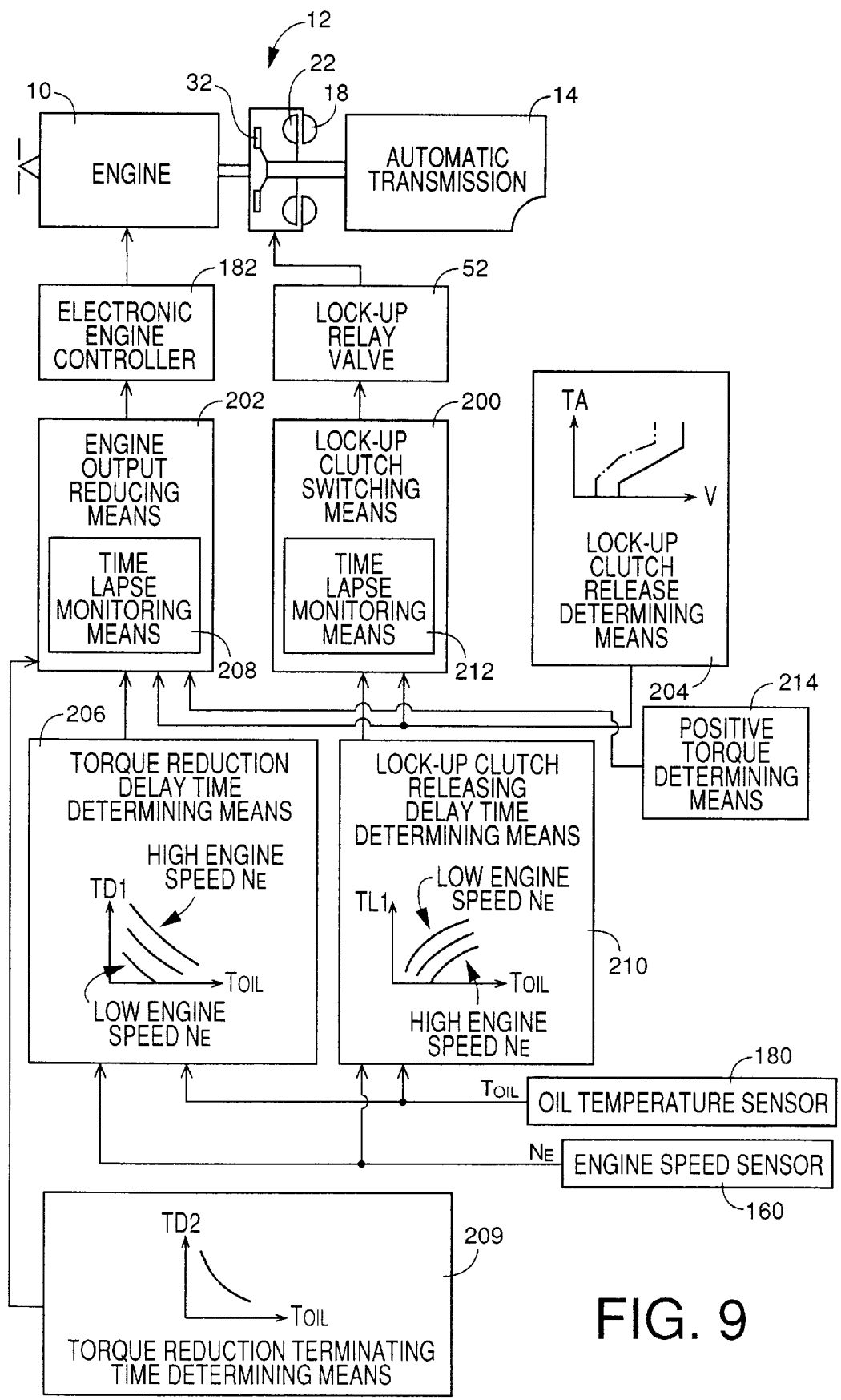
FIG. 9 is a block diagram illustrating the functions of various functional means incorporated in the electronic transmission controller of FIG. 4.

Referring next to the block diagram of FIG. 9, there will be described the functions of various functional means provided in the electronic transmission controller 184. That is, the transmission controller 184 incorporates lock-up clutch switching means 200, engine output reducing means 202, clock-up clutch release determining means 204, torque reduction delay time determining means 206, torque reduction terminating time determining means 209, lock-up clutch releasing delay time determining means 210, and positive torque determining means 214. The engine output reducing means 202 includes time lapse monitoring means 208, and the lock-up clutch switching means 200 includes time lapse monitoring means 212.

The lock-up clutch switching means 200 is basically adapted to operate the lock-up relay valve 52 from the engaging state to the releasing state to switch the lock-up clutch 32 from the engaging state to the releasing state, upon determination by the lock-up clutch release determining means 204 that the lock-up clutch 32 should be fully released.

The engine output reducing means 202 is activated upon releasing of the lock-up clutch 32 by the lock-up clutch switching means 200, to temporarily reduce the output of the engine 10 and the torque to be transmitted to the torque converter 12, for a predetermined length of time, by retarding the ignition timing of the engine 10 by a suitable amount or by reducing the number of the effective cylinders of the engine 10, or by reducing the amount of the air-fuel mixture to be supplied to the engine 10 or the amount of the fuel to be injected into the engine 10, by a suitable amount. Described in detail, the engine output reducing means 202 is adapted to initiate the temporary reduction of the output of the engine 10 prior to the full releasing of the lock-up clutch 32, when a time lapse $t_{eh}$ after the moment of the determination of full releasing of the lock-up clutch 32 by the lock-up clutch release determining means 204 has reached a torque reduction delay time TD1 which is a predetermined constant or is determined as a function of the oil temperature $T_{OIL}$ or engine speed $N_E$, for example, so that the output of the engine 10 is reduced during a time period suitable for reducing the "releasing shock" due to a change in the torque transmitted to the automatic transmission 14 upon releasing of the lock-up clutch 32, in other words, so that the reduction of the torque transmitted through the lock-up clutch 32 by releasing the lock-up clutch 32 takes place after the reduction of the output of the engine 10. The engine output reducing means 202 terminates the temporary reduction of the engine torque when a time lapse $t_{es}$ after the moment of generation of a lock-up clutch releasing command has reached a torque reduction terminating time TD2 which is longer than the torque reduction delay time TD1. The torque reduction terminating time TD2 is a predetermined constant or is determined as a function of the oil temperature $T_{OIL}$ or engine speed $N_E$, for example. With the torque reduction of the engine 10 by the engine torque reducing means 202 being terminated, the engine torque is restored to the value corresponding to the operating amount of the accelerator pedal 165.

The lock-up clutch release determining means 204 is adapted to determine whether the lock-up clutch 32 should be fully released. This determination is effected on the basis of the running condition of the vehicle (as represented by the throttle opening angle TA and the vehicle speed V), and according to ON→OFF boundary lines (for the third- and fourth-speed positions "3rd" and "4th" of the automatic transmission 14) indicated in FIG. 7, by way of example. If the running condition represented by TA and V is moved across the ON→OFF boundary line from the area on the right side of the boundary line into the area on the left side of the boundary line, the lock-up clutch release determining means 204 determines that the lock-up clutch 32 should be fully released.

The torque reduction delay time determining means 206 determines the above-indicated torque reduction delay time TD1, on the basis of at least one of: temperature $T_{OIL}$ of the working oil in the hydraulic control device 44 or lock-up clutch 32, which is detected by the oil temperature 180; speed $N_E$ of the engine 10 detected by the engine speed sensor 160; and opening angle TA of the first throttle valve 166 (which represents the load of the engine 10), which is detected by the throttle sensor 167. The engine output reducing means 202 includes time lapse monitoring means 208 for determining whether the time lapse $t_{eh}$ after the moment of determination of releasing of the lock-up clutch 32 by the lock-up clutch release determining means 204 has reached the torque reduction delay time TD1. Upon expiration of the torque reduction delay time TD1 by the time lapse monitoring means. 208, the engine output reducing means 202 applies the lock-up clutch releasing command to the electronic engine controller 182.

Figure 10:
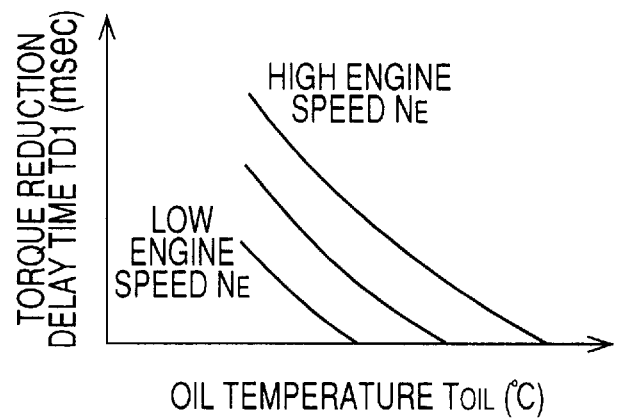
FIG. 10 is a graph showing a relationship used by torque reduction delay time determining means 206 of FIG. 9 to determine a torque reduction delay time TD1.

The torque reduction delay time determining means 206 is preferably adapted to determine the torque reduction delay time TD1 on the basis of the detected oil temperature $T_{OIL}$, and according to a predetermined relationship between the torque reduction delay time TD1 and the oil temperature $T_{OIL}$ as indicated in FIG. 10, by way of example, such that the delay time TD1 increases with a decrease in the oil temperature $T_{OIL}$. As the oil temperature $T_{OIL}$ is lowered, the time of response of the lock-up clutch 32 to the lock-up clutch releasing command increases. Therefore, the output reduction of the engine 10 by the engine output reducing means 202 may take place before the full releasing of the lock-up clutch 32 by a considerable time, when the oil temperature $T_{OIL}$ is relatively low. In view of this drawback, the delay time TD1 is increased as the oil temperature $T_{OIL}$ is lowered.

The torque reduction delay time determining means 206 is also preferably adapted to determine the torque reduction delay time TD1 on the basis of the detected engine speed $N_E$, and according to a predetermined relationship between the delay time TD1 and the engine speed $N_E$ as also indicated in FIG. 10 by way of example, such that the delay time TD1 increases with an increase in the engine speed $N_E$. As the engine speed $N_E$ is raised, the time required for the output reduction of the engine 10 to provide an intended effect of reducing the torque transmitted through the lock-up clutch 32 is reduced. In view of this fact, the delay time TD1 is increased with a rise of the engine speed $N_E$. The engine speed $N_E$ may be replaced by an engine load represented by the throttle opening angle TA, fuel injection amount or intake air quantity, since the engine load is equivalent to the engine speed $N_E$ in terms of the effect of the engine output reduction on the reduction of the torque transmitted through the lock-up clutch 32. The relationship indicated in FIG. 10 was determined by experiments so that the output of the engine 10 is reduced during a time period suitable for permitting effective reduction of the releasing shock due to rapid reduction of the torque transmitted through the lock-up clutch 32 upon releasing of the lock-up clutch 32, irrespective of the varying oil temperature $T_{OIL}$, engine speed $N_E$ or throttle opening TA. That is, the relationship of FIG. 10 was experimentally determined so that the releasing of the lock-up clutch 32 and the resulting reduction of the torque therethrough take place when the engine output has been reduced to the lowest level by the engine output reducing means 202.

Figure 11:
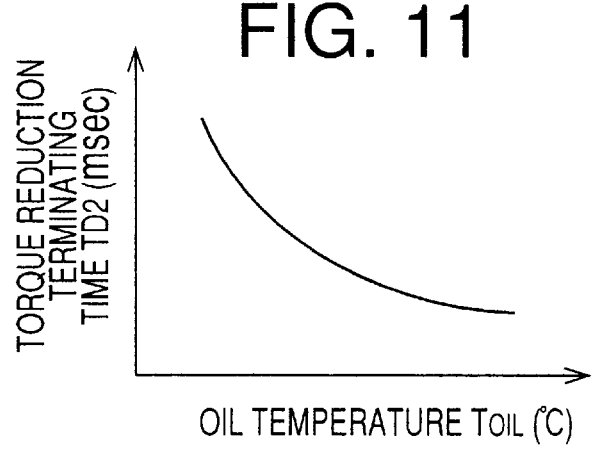
FIG. 11 is a graph showing a relationship used by torque reduction terminating time determining means 206 of FIG. 9 to determine a torque reduction terminating time TD2.

The torque reduction terminating time determining means 209 may be adapted to determine the torque reduction terminating time TD2 on the basis of the detected oil temperature $T_{OIL}$ and according to a predetermined relationship between the delay time TD2 and the oil temperature $T_{OIL}$, as indicated in FIG. 11 by way of example, such hat the delay time TD2 decreases with a decrease in the oil temperature $T_{OIL}$. When the time lapse $t_{es}$ after the moment of generation of the lock-up clutch releasing command has reached the determined terminating time TD2, the engine output reducing means 202 commands the engine controller 182 to advance the ignition timing to the original value, or increase the number of the effective cylinders of the engine 10, air-fuel mixture amount or fuel injection amount to the original value before the output reduction of the engine 10.

The lock-up clutch releasing delay time determining means 210 is adapted to determine a lock-up clutch releasing delay time TL1 on the basis of at least one of the oil temperature $T_{OIL}$, engine speed $N_E$ and engine load. The lock-up clutch switching means 200 includes time lapse monitoring means 212 for determining whether the time lapse $t_{eh}$ after the moment of determination of releasing of the lock-up clutch 32 by the lock-up clutch release determining means 204 has reached the determined lock-up releasing delay time TL1. When the time lapse monitoring means 212 determines that the time lapse $t_{eh}$ has reached the delay time TL1, the lock-up clutch switching means 200 commands the lock-up relay valve 52 to fully release the lock-up clutch 32.

Figure 12:
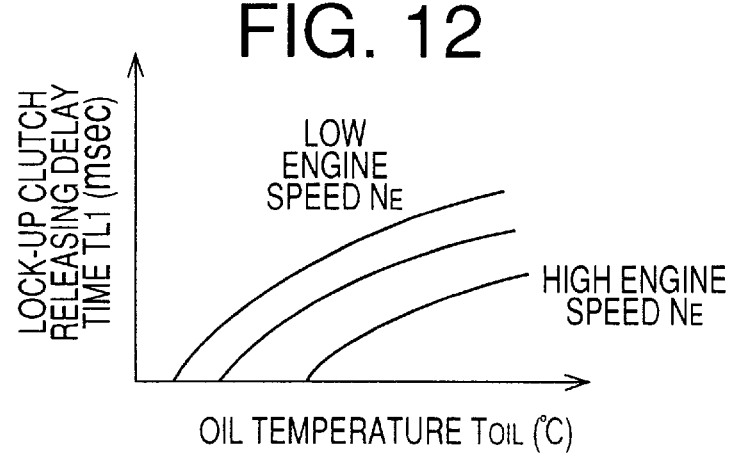
FIG. 12 is a graph showing a relationship used by lock-up clutch releasing delay time determining means 210 of FIG. 9 to determine a lock-up clutch releasing delay time TL1.

The lock-up clutch releasing delay time determining means 210 is preferably adapted to determine the lock-up clutch releasing delay time TL1 on the basis of the oil temperature $T_{OIL}$ and according to a predetermined relationship between the delay time TL1 and the oil temperature $T_{OIL}$ as indicated in FIG. 12 by way of example, such that the delay time TL1 increases with an increase in the oil temperature $T_{OIL}$. In this respect, it is noted that the time of response of the lock-up clutch 32 to the lock-up clutch releasing command decreases with a rise of the oil temperature $T_{OIL}$.

The lock-up clutch releasing delay time determining means 210 is also preferably adapted to determine the delay time TL1 on the basis of the detected engine speed $N_E$, and according to a predetermined relationship between the delay time TL1 and the engine speed $N_E$ as also indicated in FIG. 12 by way of example, such that the delay time TL1 decreases with an increase in the engine speed $N_E$. As the engine speed $N_E$ is raised, the time required for the output reduction of the engine 10 to have an intended effect of reducing the torque transmitted through the lock-up clutch 32 is reduced. When the engine speed $N_E$ is relatively high, the generation of the lock-up clutch releasing command may be considerably delayed with respect to the torque reduction by the engine output reduction by the engine output reducing means 202. In view of this fact, the delay time TL1 is reduced with a rise of the engine speed $N_E$. The engine speed $N_E$ may be replaced by an engine load represented by the throttle opening angle TA, fuel injection amount or intake air quantity, since the engine load is equivalent to the engine speed $N_E$ in terms of the effect of the engine output reduction on the reduction of the torque transmitted through the lock-up clutch 32. The relationship indicated in FIG. 10 was determined by experiments so that the output of the engine 10 is reduced during a time period suitable for permitting effective reduction of the releasing shock due to rapid reduction of the torque transmitted through the lock-up clutch 32 upon releasing of the lock-up clutch 32, irrespective of the varying oil temperature $T_{OIL}$, engine speed $N_E$ or throttle opening angle TA. That is, the relationship of FIG. 12 was experimentally determined so that the releasing of the lock-up clutch 32 and the resulting reduction of the torque therethrough take place when the engine output has been reduced to the lowest level by the engine output reducing means 202.

Preferably, the engine output reducing means 202 is adapted to reduce the output of the engine 10 only when the positive torque determining means 214 determines that the vehicle is in a positive torque drive state in which a torque is transmitted from the engine 10 to the drive wheels. For example, the positive torque determining means 214 determines the positive torque drive state of the vehicle, if the idling position switch of the throttle sensor 167 is off, or if the throttle opening angle TA is larger than a predetermined threshold, or if the output torque of the engine 10 as estimated from the throttle opening angle TA and engine speed $N_E$ is a positive value. In this respect, it is noted that the problem of the "releasing shock" due to rapid reduction of the torque to be transmitted to the automatic transmission 14 upon releasing of the lock-up clutch 32 generally occurs as a result of an increase in the amount of operation of the accelerator pedal 165 (an increase in the throttle opening angle TA) while the lock-up clutch 32 is in the fully engaged state. Accordingly, it is desirable to activate the engine output reducing means 202 to reduce the output of the engine 10 only when the above problem is likely to occur.

Figure 13:
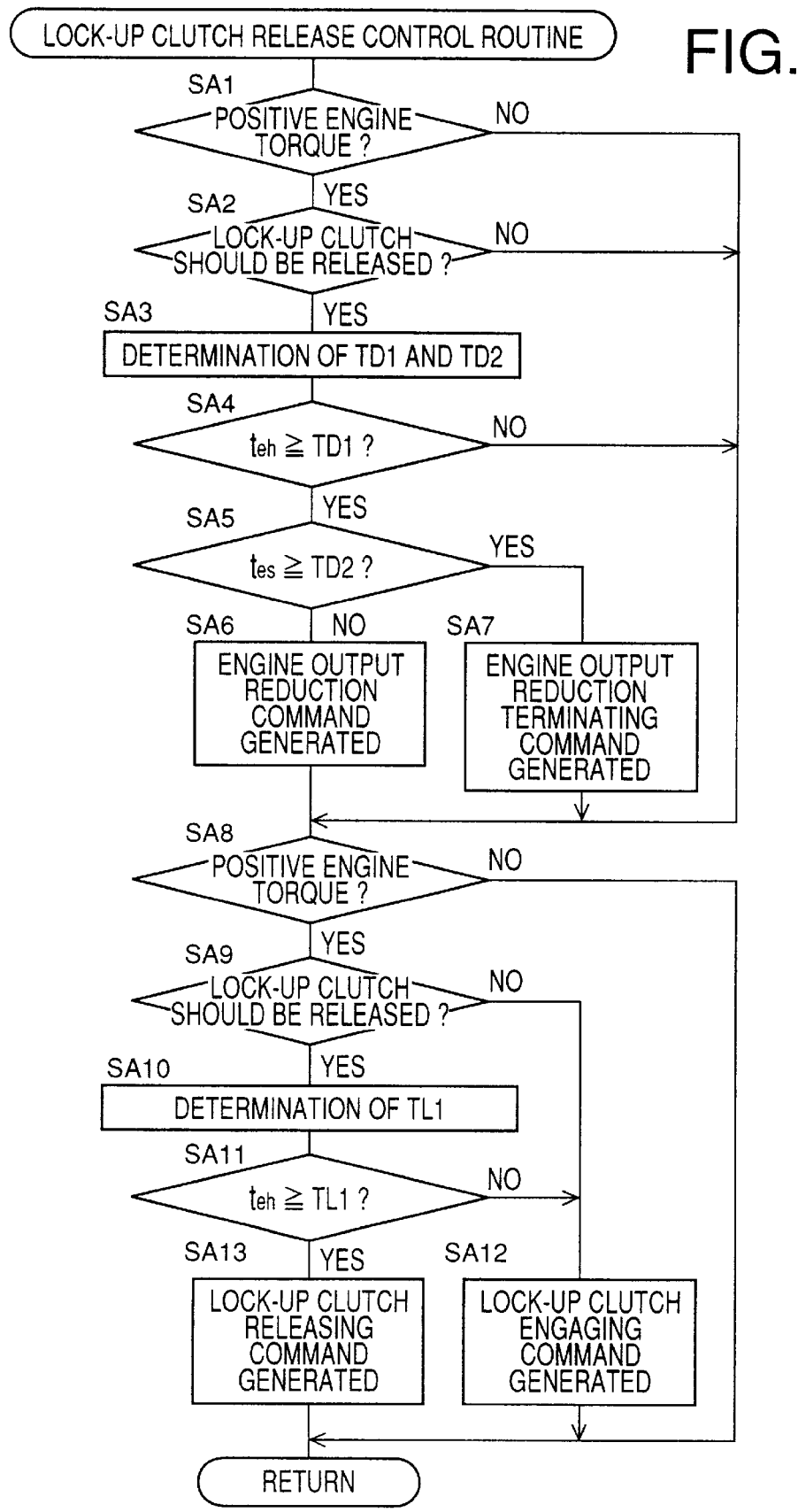
FIG. 13 is a flow chart illustrating a lock-up clutch release control routine executed by the transmission controller of FIG. 4.

The electronic transmission controller 184 is adapted to execute a lock-up clutch release control routine illustrated in the flow chart of FIG. 13. In this routine, steps SA1 through SA7 are provided to control the time of initiation of the engine output reduction, while steps SA8 through SA13 are provided to control the time of generation of the lock-up clutch releasing command for fully releasing the lock-up clutch 32.

The routine of FIG. 13 is initiated with step SA1 corresponding to the positive torque determining means 215, to determine whether the vehicle is running in the positive torque drive state, depending upon whether the idling position switch of the throttle sensor 167 is off, whether the throttle opening angle TA is larger than the threshold, or whether the engine output torque as estimated from the throttle opening angle TA or engine speed $N_E$ is positive. If a negative decision (NO) is obtained in step SA1, the control flow goes to step SA8 and the following steps. If an affirmative decision (YES) is obtained in step SA1, the control flow goes to step SA2 corresponding to the lock-up clutch release determining means 204, to determine whether the lock-up clutch 32 should be fully released. This determination is effected on the basis of the detected throttle opening angle TA and vehicle speed V, and according to the ON→OFF boundary line (third-speed) or ON→OFF boundary line (fourth-speed) indicated in FIG. 7.

Figure 14:
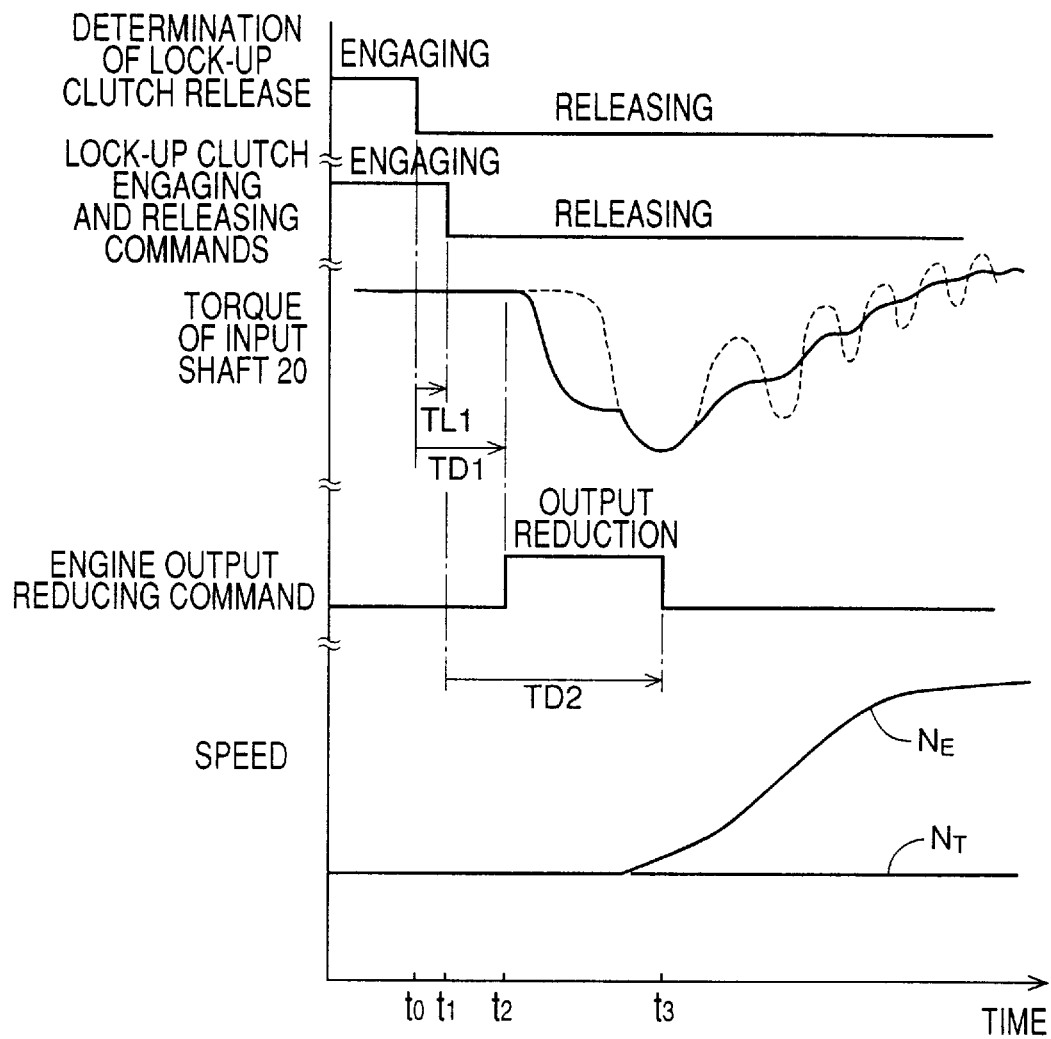
FIG. 14 is a time chart for explaining the control in the routine of FIG. 13.

If a negative decision (NO) is obtained in step SA2, the control flow goes to step SA8. If an affirmative decision (YES) is obtained in step SA2, the control flow goes to step SA3 corresponding to the torque reduction delay time determining means 206 and the torque reduction terminating time determining means 209, to determine the torque reduction delay time TD1 on the basis of the detected oil temperature $T_{OIL}$ and engine speed $N_E$ and according the predetermined relationship of FIG. 10, and determine the torque reduction terminating time TD2 on the basis of the detected oil temperature $T_{OIL}$ and according to the predetermined relationship of FIG. 11. The terminating time TD2 is longer than the delay time TD1. Point of time $t_0$ in FIG. 14 is the moment at which the affirmative decision (YES) is obtained in step SA2.

Step SA3 is followed by step SA4 corresponding to the time lapse monitoring means 208, to determine whether the time lapse $t_{eh}$ after the moment $t_0$ of determination of the releasing of the lock-up clutch 32 by the determining means 204 has reached the torque reduction delay time TD1 determined in step SA3. If an affirmative decision (YES) is obtained in step SA4, the control flow goes to step SA5 to determine whether the time lapse $t_{es}$ after the moment $t_1$ of generation of the lock-up clutch releasing command has reached the torque reduction terminating time TD2 also determined in step SA3. If a negative decision (NO) is obtained in step SA4, the control flow goes to step SA8. If an affirmative decision (YES) is obtained in step SA4, and a negative decision (NO) is obtained in step SA5, the control flow goes to step SA6 corresponding to the engine output reducing means 202, in which the engine controller 182 is commanded to generate the engine output reducing command for reducing the output of the engine 10. Point of time $t_2$ in FIG. 14 is the moment at which the engine output reducing command is generated from the engine output reducing means 202. After a given response time of the engine 10 has passed after the generation of the engine output reducing command, the reduction of the torque of the input shaft 20 of the automatic transmission 14 is initiated.

When the time lapse $t_{es}$ has reached the determined torque reduction terminating time TD2 during repeated execution of the routine of FIG. 13, an affirmative decision (YES) is obtained in step SA5, the control flow goes to step SA7 corresponding to the engine output reducing means 202, in which the engine controller 182 is commanded to terminate the temporary reduction of the engine output. Point of time $t_3$ in FIG. 14 is the moment at which the engine torque reduction is terminated.

Steps SA6 and SA7 are followed by step SA8 which corresponds to the positive torque determining means 214 and which is identical with step SA1. Step SA8 is implemented when the negative decision (NO) is also obtained in any one of steps SA1–SA4 as described above. If a negative decision (NO) is obtained in step SA8, one cycle of execution of the routine of FIG. 13 is terminated. If an affirmative decision (YES) is obtained in step SA8, the control flow goes to step SA9 which corresponds to the lock-up clutch release determining means 204 and which is identical with step SA2. If a negative decision (NO) is obtained in step SA9, the control flow goes to step SA12 to generate a lock-up clutch engaging command for fully engaging the lock-up clutch 32, and one cycle of execution of the routine is terminated. If an affirmative decision (YES) is obtained in step SA9, the control flow goes to step SA10 corresponding to the lock-up clutch releasing delay time determining means 210, in which the lock-up clutch releasing delay time TL1 is determined on the basis of the detected oil temperature $T_{OIL}$ and engine speed $N_E$ and according to the predetermined relationship of FIG. 12.

Step SA10 is followed by step SA11 corresponding to the time lapse monitoring means 212, to determine whether the time lapse $t_{eh}$ after the moment of determination of the lock-up clutch 32 has reached the lock-up clutch releasing time delay TL1 determined in step SA10. If a negative decision (NO) is obtained in step SA11, the control flow goes to step SA12 in which the lock-up clutch engaging command is maintained. If an affirmative decision (YES) is obtained in step SA11, the control flow goes to step SA13 corresponding to the lock-up clutch switching means 200, to generate the lock-up clutch releasing command for operating the lock-up relay valve 52 to fully release the lock-up clutch 32, and one cycle of execution of the routine of FIG. 13 is terminated. Point of time $t_1$ in FIG. 14 is the moment at which the lock-up clutch releasing command is generated in step SA13. While the full releasing of the lock-up clutch 32 results in a decrease in the torque to be transmitted to the input shaft 20, this full releasing is initiated only after the torque of the input shaft 20 is reduced to the smallest value by the reduction of the output of the engine 10. Accordingly, the torque of the input shaft 20 is smoothly reduced upon releasing of the lock-up clutch 32. Broken line in FIG. 4 shows a change in the torque of the input shaft 20 where the output of the engine 10 were not reduced immediately before the full releasing of the lock-up clutch 32 according to the principle of the present invention. This change in the torque involves an initial rapid decrease of the torque and a subsequent vibration of the torque due to the initial rapid decrease. The extent of this phenomenon increases with an increase in the angle of maximum relative rotation between the piston 30 and the hub 29 of the turbine impeller 18.

In the present embodiment, the engine output reducing means 202 temporarily reduces the output of the engine 10 in step SA6 when the lock-up clutch 32 is fully released in step SA13 by the lock-up clutch switching means 200. Consequently, the lock-up clutch 32 is fully released only after the temporary reduction of the output of the engine 10, so that the consequent reduction of the torque to be transmitted to the input shaft 20 through the lock-up clutch 32 takes place only after the engine output is reduced. In this arrangement, the amount of rapid reduction of the transmitted torque due to the full releasing of the lock-up clutch 32 is made smaller than in the conventional arrangement in which the engine output is not reduced upon releasing of the lock-up clutch. Thus, the present arrangement is effective to minimize the "releasing shock" of the vehicle caused upon full releasing of the lock-up clutch 32. In other words, the engine output reducing means 202 is adapted to reduce the output of the engine 10 prior to the actual releasing of the lock-up clutch 32 by the lock-up clutch switching means 200, so that the torque to be transmitted to the lock-up clutch 32 is first reduced by the engine output reduction by the engine output reducing means 202, and then the torque to be transmitted to the input shaft 20 is reduced by the full releasing of the lock-up clutch 32, whereby the rate and amount of reduction of the transmitted torque due to the full releasing of the lock-up clutch 32 are reduced, to effectively prevent the releasing shock of the lock-up clutch 32, namely, the initial rapid reduction and the following vibration of the transmitted torque as indicated by broken line in FIG. 14.

Further, the present embodiment is provided with the lock-up clutch release determining means 204 (step SA2) for determining that the lock-up clutch 32 should be fully released, and the torque reduction delay time determining means 206 (step SA3) for determining the torque reduction delay time TD1. The determination by the determining means 204 is effected on the basis of the detected vehicle running condition (as represented by the throttle opening angle TA and vehicle speed V) and according to the predetermined ON→OFF boundary lines as indicated in FIG. 7. The torque reduction delay time TD1 is determined on the basis of the temperature $T_{OIL}$ of the working oil of the lock-up clutch 32 and the engine speed $N_E$. The engine output reducing means 202 is adapted to initiate the output reduction of the engine 10 when the time lapse $t_{eh}$ after the moment of the determination of the full releasing of the lock-up clutch 32 by the lock-up clutch release determining means 204 has reached the determined torque reduction delay time TD1. Since the delay time TD1 is determined depending upon the releasing response of the lock-up clutch 32 and the output reduction response of the engine 10, the engine output reduction is initiated at an optimum point of time for preventing the releasing shock of the lock-up clutch 32.

Described more specifically, the torque reduction delay time determining means 206 is adapted to determine the delay time TD1 on the basis of the detected oil temperature $T_{OIL}$ of the lock-up clutch 32 and according to the predetermined relationship of FIG. 10, such that the delay time TD1 increases with a decrease in the oil temperature $T_{OIL}$, since the response of the lock-up clutch 32 to the lock-up clutch releasing command decreases with a decrease in the oil temperature $T_{OIL}$. This arrangement is effective to prevent the engine output reduction by the engine output reducing means 202 from taking place a considerable time before the full releasing of the lock-up clutch 32 takes place.

Further, the torque reduction delay time determining means 206 is adapted to determine the delay time TD1 on the basis of the detected engine speed $N_E$ or engine load and according to the predetermined relationship of FIG. 10, such that the delay time TD1 increases with an increase in the engine speed $N_E$ or engine load. The engine load may be represented by the throttle opening angle TA, fuel injection amount or intake air quantity. As the engine speed $N_E$ or engine load increases, the time required for the output reduction of the engine 10 to provide an intended effect of reducing the torque transmitted through the lock-up clutch 32 is shortened. In view of this tendency, the delay time TD1 is determined so that the engine output reduction by the engine output reducing means 202 does not provide the torque reducing effect a considerable time before the occurrence of the full releasing of the lock-up clutch 32.

The present embodiment is also provided with the lock-up clutch releasing delay time determining means 210 (step SA10) for determining the lock-up clutch releasing delay time TL1 on the basis of the oil temperature $T_{OIL}$ of the lock-up clutch 32 and engine speed $N_E$. The lock-up clutch switching means 200 is adapted to generate the lock-up clutch releasing command when the time lapse $t_{eh}$ after the moment of determination of the full releasing of the lock-up clutch 32 by the lock-up clutch release determining means 204 (step SA9) has reached the determined lock-up clutch releasing delay time TL1. Since the delay time TL1 is determined depending upon the releasing response of the lock-up clutch 32 and the output reduction response of the engine 10, the lock-up clutch 32 is fully released at an optimum point of time for preventing the releasing shock of the lock-up clutch 32.

The lock-up clutch releasing delay time determining means 210 is further adapted to determine the delay time TL1 on the basis of the oil temperature $T_{OIL}$ of the lock-up clutch 32 and according to the predetermined relationship of FIG. 12, such that the delay time TL1 increases with an increase in the oil temperature $T_{OIL}$, since the response of the lock-up clutch 32 to the lock-up clutch releasing command increases with the increase in the oil temperature $T_{OIL}$. This arrangement is effective to prevent the full releasing of the lock-up clutch 32 by the lock-up clutch switching means 200 from taking place a considerable time before the engine output reduction by the engine output reducing means 202, and prevent the resulting rapid reduction of the transmitted torque upon releasing of the lock-up clutch 32.

The lock-up clutch releasing delay time determining means 210 is also adapted to determine the delay time TL1 on the basis of the detected engine speed $N_E$ or engine load and according to the predetermined relationship of FIG. 12, such that the delay time TL1 decreases with an increase in the engine speed $N_E$ or engine load, since the time required for the engine output reduction to provide the intended torque reducing effect is reduced as the engine speed or load increases. This arrangement is effective to prevent the full releasing of the lock-up clutch 32 by the lock-up clutch switching means 200 from taking place a considerable time before the torque reduction by the engine output reducing means 202 takes place.

The present embodiment is also provided with the positive torque determining means 214 (steps SA1 and SA8) for determining whether the vehicle is in the positive torque drive state with a torque being transmitted from the engine 10 to the drive wheels of the vehicle. The engine output reducing means 202 is adapted to reduce the engine output only when the positive torque determining means 214 determines that the vehicle is in the positive torque drive state. In other words, the engine output reducing means 202 does not reduce the engine output when the vehicle is in a negative torque drive state in which a torque is transmitted from the drive wheels to the engine 10. In the negative torque drive state, the problem of rapid reduction of the transmitted torque upon full releasing of the lock-up clutch 32 is unlikely to occur. Thus, the present arrangement is effective to avoid unnecessary reduction of the engine output by the engine output reducing means 202. In this respect, it is noted that the problem of the "releasing shock" due to rapid reduction of the transmitted torque upon releasing of the lock-up clutch 32 is likely to occur when the accelerator pedal is depressed while the lock-up clutch 32 is in the fully engaged state.

Figure 15:
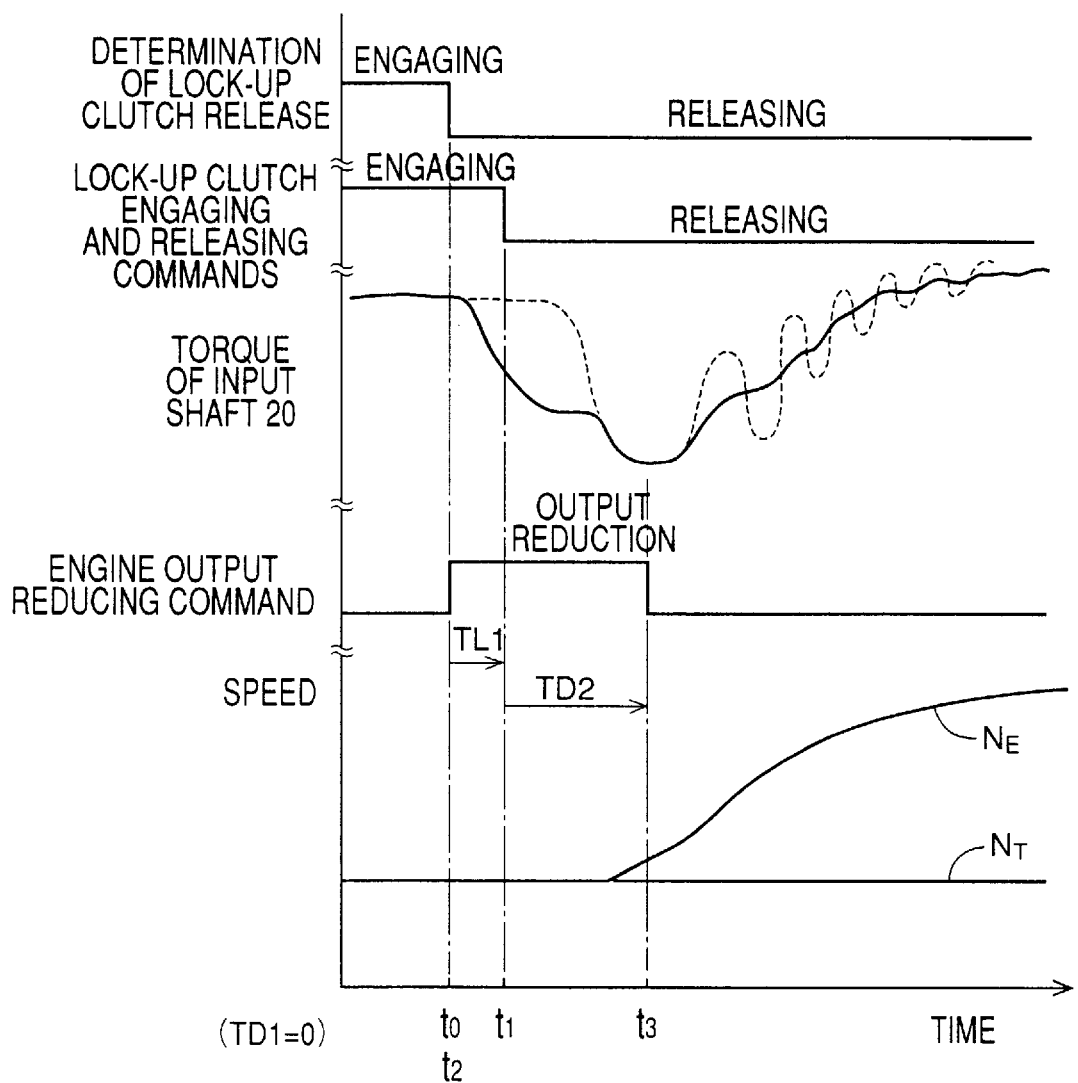
FIG. 15 is a time chart for explaining a case where the torque reduction delay time TD1 is set to zero in the routine of FIG. 13.

The graph of FIG. 15 shows a case where the torque reduction delay time TD1 is set to zero in a motor vehicle wherein the lock-up clutch 32 controlled by the transmission controller 184 has a comparatively short releasing response time $T_{RT}$. The releasing response time $T_{RT}$ is a time from the moment of generation of the lock-up clutch releasing command by the lock-up clutch switching means 200 to the moment of the actual releasing of the lock-up clutch 32. In this case, the torque reduction delay time determining means 206 and the data representative of the relationship of FIG. 10 for determining the delay time TD1 are not necessary. This arrangement is suitable for preventing the releasing shock of the lock-up clutch 32 whose releasing response time $T_{RT}$ is comparatively short as in a relatively small-sized motor vehicle.

Figure 16:
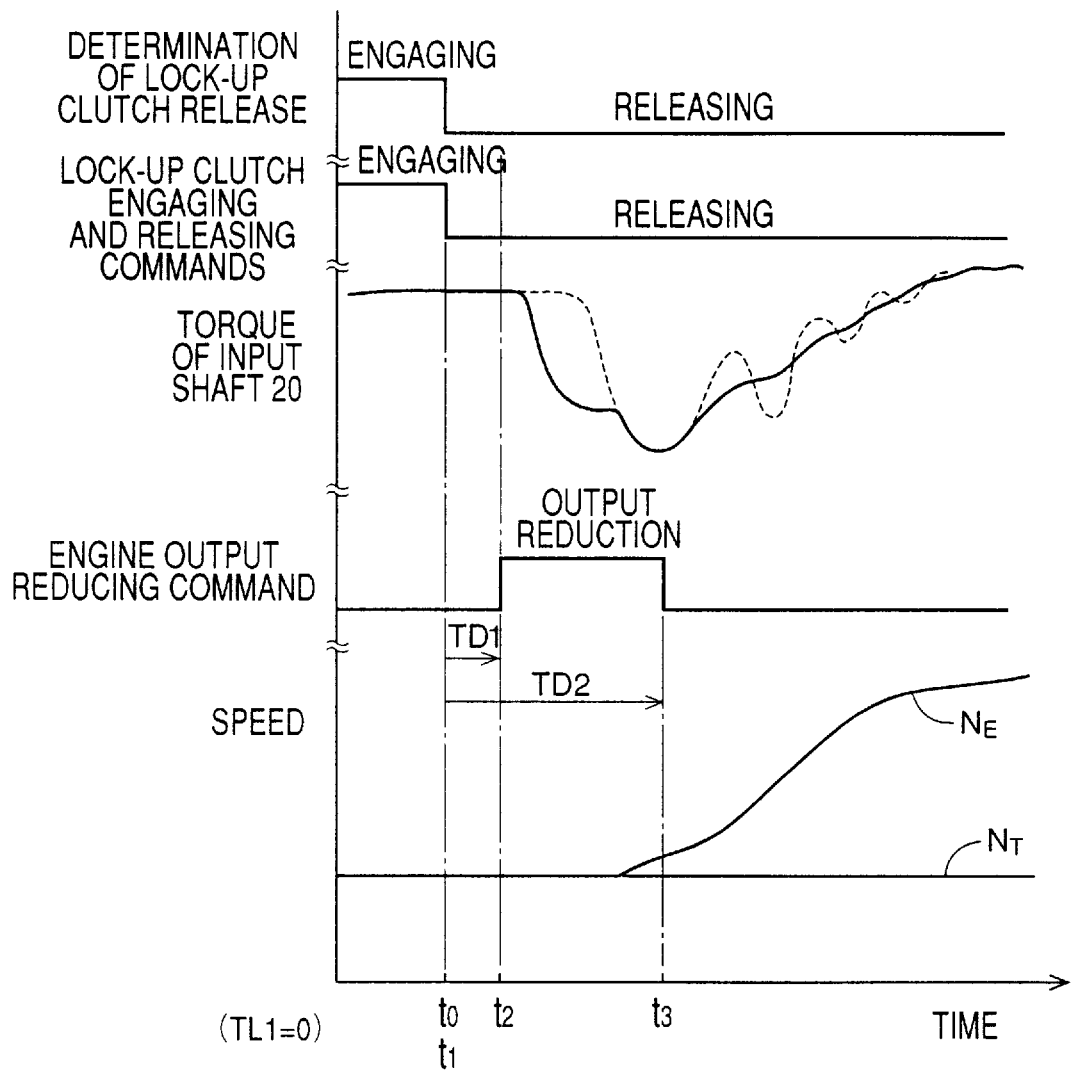
FIG. 16 is a time chart for explaining a case where the lock-up clutch releasing delay time TL1 is set to zero in the routine of FIG. 13.

The graph of FIG. 16 shows a case where the lock-up clutch releasing time delay TL1 is set to zero in a motor vehicle wherein the releasing response time $T_{RT}$ of the lock-up clutch 32 is comparatively long. In this case, the lock-up clutch releasing delay time determining means 210 and the data representative of the relationship of FIG. 12 for determining the delay time TL1 are not necessary. This arrangement is suitable for preventing the releasing shock of the lock-up clutch 32 whose releasing response time $T_{RT}$ is comparatively long as in a relatively large-sized motor vehicle.

Figure 17:
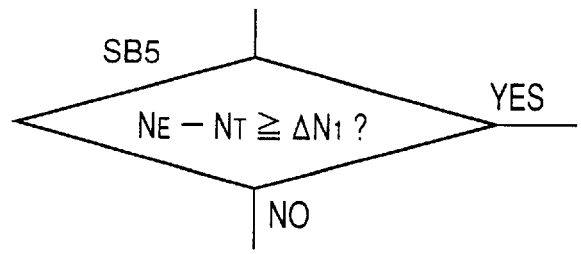
FIG. 17 is a view showing a step SB5 substituted for step SA5 of the routine of FIG. 13, in another embodiment of this invention.

Step SA5 of the flow chart of FIG. 13 may be replaced by step SB5 indicated in FIG. 17. In this embodiment, step SB5 is formulated to determine whether a difference ($N_E$–$N_T$) between the engine speed $N_E$ and the speed $N_T$ of the turbine impeller 22 is equal to or larger than a predetermined threshold $\Delta N1$. If a negative decision (NO) is obtained in step SB5, the control flow goes to step SA6 of FIG. 13 in which the engine output reducing command is maintained. If an affirmative decision (YES) is obtained in step SB5, the control flow goes to step SA7 of FIG. 13 to terminate the output reduction of the engine 10. The threshold $\Delta N1$ corresponds to the difference ($N_E$–$N_T$) at point of time $t_3$ indicated in FIG. 14.

Figure 18:
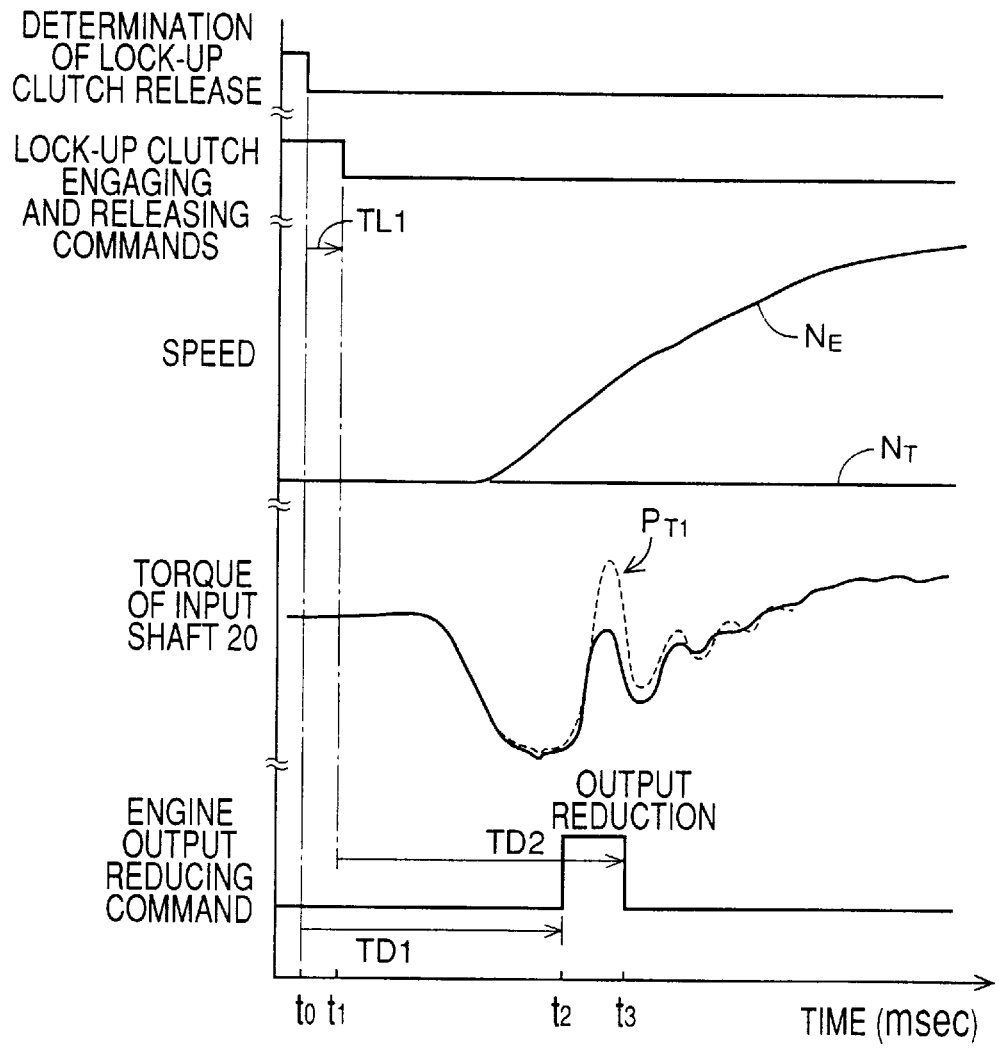
FIG. 18 is a time chart for explaining a case where the engine output reducing command is generated after a fall of a transmission input shaft drive torque, and before a first peak value $P_{T1}$ of the torque is reached during the following rise of the torque, in a further embodiment of the invention.

The graph of FIG. 18 shows a case where the torque reduction delay time TD1 is determined so that the engine output reduction provides the intended torque reducing effect after the moment of initiation of the torque of the input shaft 20 due to the releasing of the lock-up clutch 32, and when a first peak value $P_{T1}$ of the torque of the input shaft 20 appears. In the present embodiment, the engine output reducing command is generated after the torque of the input shaft 20 begins to be reduced due to the releasing of the lock-up clutch 32, and shortly before the torque has subsequently increased to the first peak $P_{T1}$ value. Broken line in FIG. 18 indicates the change in the torque of the input shaft 20 where the engine output were not reduced. In the embodiment of FIG. 18, the torque of the input shaft 20 after the initial reduction changes smoothly with a smaller amount of torque vibration following the first peak, as indicated by solid line, than in the case where the engine output reduction were not effected.

Figure 19:
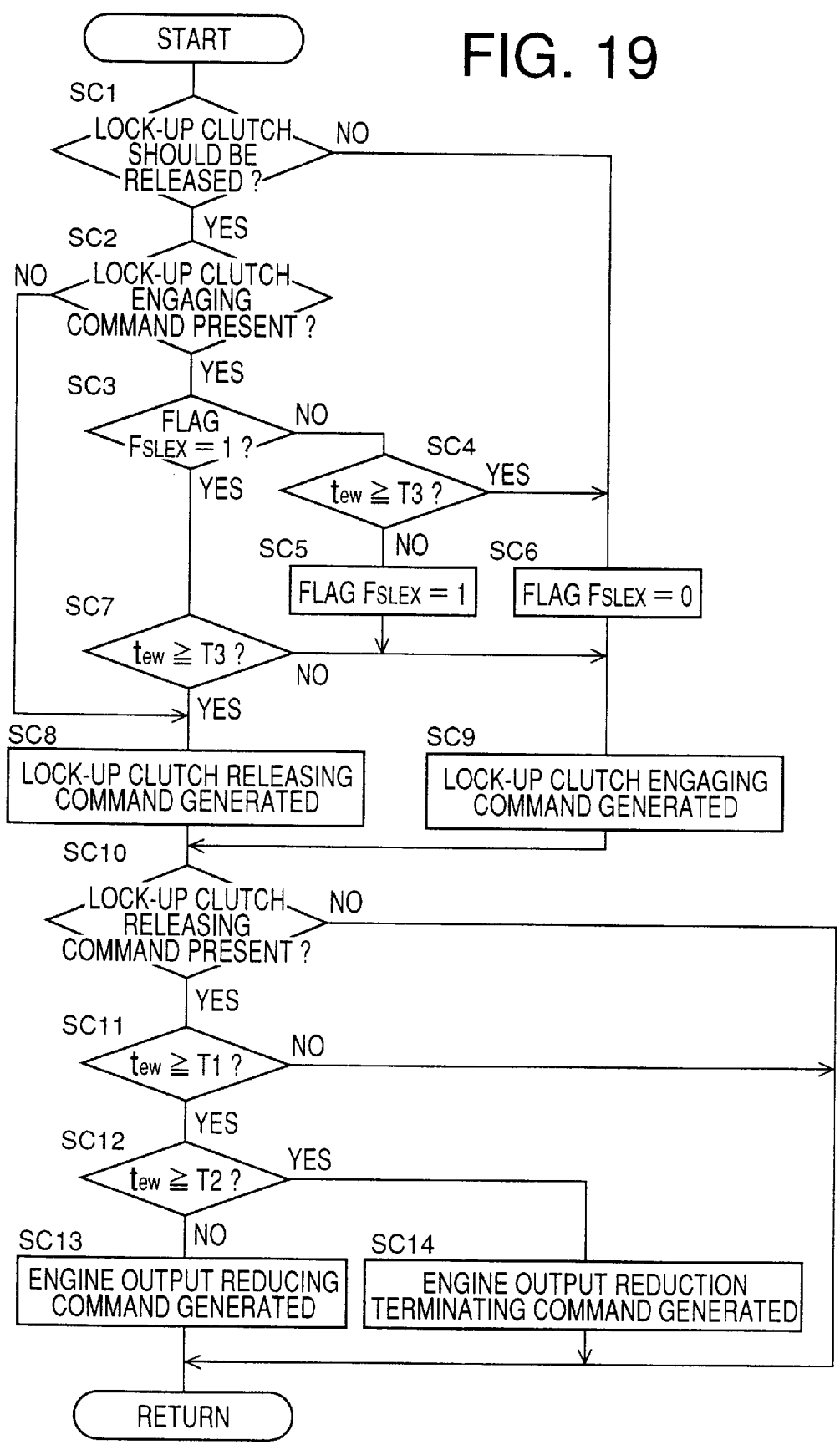
FIG. 19 is a flow chart illustrating a lock-up clutch release control routine used in a still further embodiment of the invention, wherein the engine output reducing command is generated on the basis of an ignition timing of the engine.

Referring next to the flow chart of FIG. 19, there is illustrated a lock-up clutch release control routine executed by the electronic transmission controller 184 in another embodiment of this invention. Where the engine output reduction by the engine output reducing means 202 is achieved by retarding the ignition timing or reducing the number of the effective cylinders of the engine 10, the time at which the output reduction of the engine 10 is effective to reduce the torque to be transmitted to the input shaft 20 through the lock-up clutch 32 is influenced by the ignition timing. Therefore, there may exist a variation in the time interval between the moment of generation of the engine output reducing command and the moment at which the engine output reduction provides the torque reducing effect. For instance, the variation in the above time interval is about 25 msec at 1200 r.p.m. of the 4-cylinder gasoline engine 10. Therefore, where the period of the engine output reduction is relatively short as in the example of FIG. 18, the engine output reduction may not have the intended torque reducing effect due to the variation in the time interval. Even where the period of the engine output reduction is comparatively long, the torque reducing effect of the engine output reduction may be unstable. The variation in the above-indicated interval tends to increase as the ignition period increases, that is, as the engine speed $N_E$ is lowered. To deal with the drawback indicated above, the present embodiment of FIG. 18 is arranged to control the timings of generation of the lock-up clutch releasing command and the engine output reducing command, on the basis of the ignition timing (points of time at which combustion occurs in the cylinders of the engine 10). Steps SC1 through SC9 are provided for controlling the releasing of the lock-up clutch 32, while steps SC10 through SC14 are provided for controlling the temporary reduction of the engine output.

The routine of FIG. 19 is initiated with step SC1 corresponding to the lock-up clutch release determining means 204, to determine whether the lock-up clutch 32 should be fully released. If a negative decision (NO) is obtained in step SC1, it means that the lock-up clutch 32 is fully engaged, and the control flow goes to step SC6 in which a flag $F_{SLEX}$ is reset to "0". Step SC6 is followed by step SC9 to generate the lock-up clutch engaging command for holding the lock-up clutch 32 in the fully engaged state. Step SC9 is followed by step SC10 to determine whether the lock-up clutch releasing command is present. In this case where step SC10 is preceded by step SC9, a negative decision (NO) is obtained in step SC10, and one cycle of execution of the routine of FIG. 19 is terminated.

If an affirmative decision (YES) is obtained in step SC1, the control flow goes to step SC to determine whether the lock-up clutch engaging command for engaging the lock-up clutch 32 is present. At point of time $t_0$ indicated in FIG. 20, the lock-up clutch engaging command is present. Initially, an affirmative decision (YES) is obtained in step SC2, and the control flow goes to step SC3 to determine whether the flag $F_{SLEX}$ is set at "1". Since a negative decision (NO) is initially obtained in step SC3, the control flow goes to step SC4 to determine a time lapse $t_{ew}$ from the ignition timing of the engine 10 has reached a predetermined lock-up clutch releasing delay time T3. The time lapse $t_{ew}$ is measured by a time counter $Ct_{ew}$ which is started upon each ignition while the lock-up clutch releasing command is present, in an interruption routine of FIG. 21 which is executed upon each ignition or each ½ rotation of the crankshaft 16 (in the case of the 4-cycle 4-cylinder engine). If an affirmative decision (YES) is obtained in step SC4, step SC6 in which the flag $F_{SLEX}$ is held at "0". If a negative decision (NO) is obtained in step SC4, the control flow goes to step SC5 to set the flag $F_{SLEX}$ to "1", and to step SC9 and the following steps. At point of time $t_1$ in FIG. 20, the flag $F_{SLEX}$ is turned from "0" to "1". When the determination that the lock-up clutch 32 should be fully released is made as indicated by broken line in FIG. 14, the flag $F_{SLEX}$ is immediately set to "1".

After the flag $F_{SLEX}$ is set to "1", an affirmative decision (YES) is obtained in step SC3, and the control flow goes to step SC7 corresponding to the time lapse monitoring means 212, to determine whether the time lapse $t_{ew}$ after the ignition timing has reached the lock-up clutch releasing delay time T3. While a negative decision (NO) is obtained in step SC7, step SC9 is repeatedly implemented so that the lock-up clutch 32 is held in the fully engaged state. If an affirmative decision (YES) is obtained in step SC7, the control flow goes to step SC8 corresponding to the lock-up clutch switching means 200, to generate the lock-up clutch releasing command for fully releasing the lock-up clutch 32. At point of time $t_2$ in FIG. 20, the lock-up clutch releasing command is generated. Thus, the lock-up clutch releasing command for fully releasing the lock-up clutch 32 is generated when the predetermined delay time T3 has passed after the ignition timing after the determination of the full releasing of the lock-up clutch 32.

Step SC8 is followed by step SC10 to determine whether the lock-up clutch releasing command is present. An affirmative decision (YES) is obtained in step SC10 immediately after the generation of the lock-up clutch releasing command in step SC8. In this case, the control flow goes to step S11 corresponding to the time lapse monitoring means 208, to determine whether the time lapse $t_{ew}$ after the ignition timing has reached a predetermined torque reduction delay time T1. If an affirmative decision (YES) is obtained in step SC11, the control flow goes to step SC12 to determine whether the time lapse $t_{ew}$ has reached a predetermined torque reduction terminating time T2, which is longer than the torque reduction delay time T1.

If a negative decision (NO) is obtained in step SC11, one cycle of execution of the routine of FIG. 19 is terminated. If an affirmative decision (YES) is obtained in step SC11 and a negative decision (NO) is obtained in step SC12, the control flow goes to step SC13 corresponding to the engine output reducing means 202, to generate the engine output reducing command for temporarily reducing the output of the engine 10. At point of time $t_3$ indicated in FIG. 20, the engine output reducing command is generated. When an affirmative decision (YES) is obtained in step SC12 during repeated execution of the routine of FIG. 19, the control flow goes to step SC14 to generate the engine output reduction terminating command for terminating the temporary reduction of the engine output and restoring the engine output to a level corresponding to the throttle opening angle TA.

Figure 20:
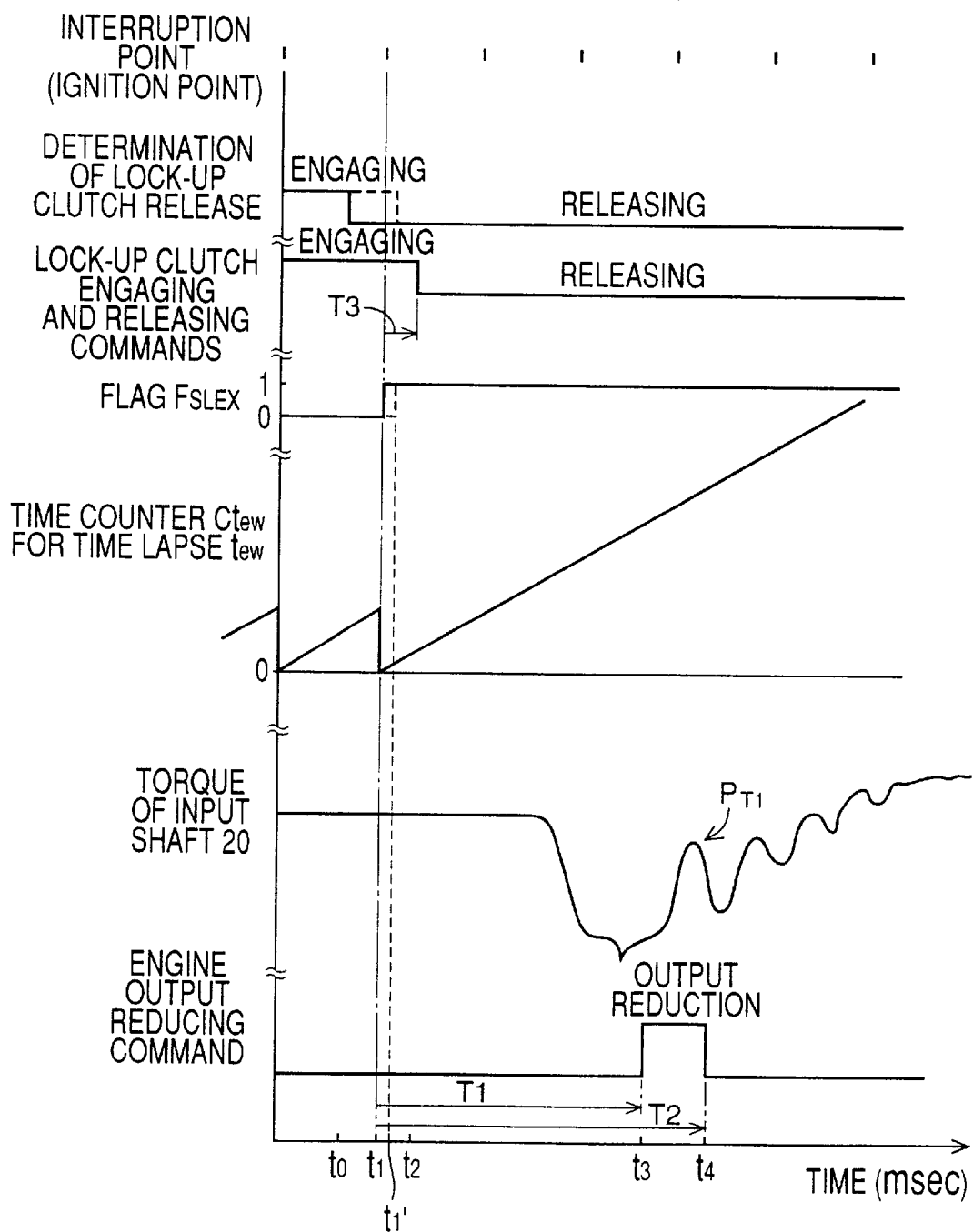
FIG. 20 is a time chart for explaining the control in the routine of FIG. 19.
Figure 21:
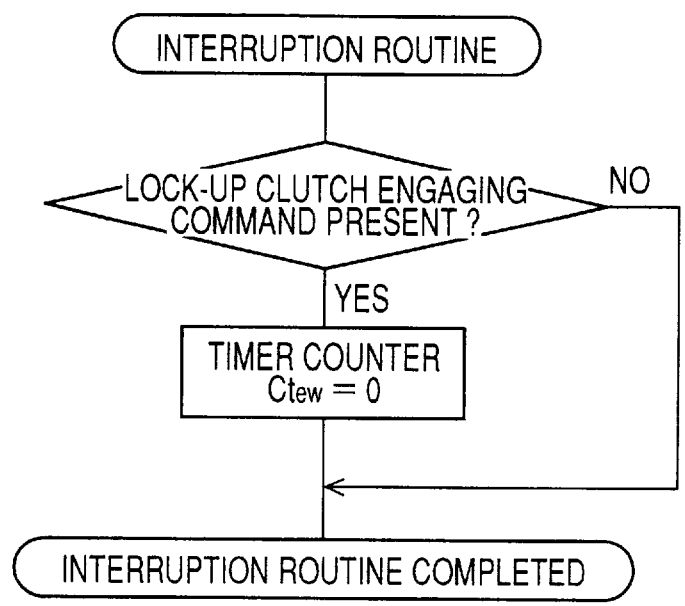
FIG. 21 is a flow chart illustrating an interruption routine executed in synchronization with the ignition timing, to measure a time lapse after the ignition, in the embodiment of FIG. 19.

In the present embodiment of FIG. 19, the engine output reduction takes place after the torque of the input shaft 20 begins to be reduced due to the releasing of the lock-up clutch 32, and shortly before the torque has subsequently increased to the first peak value $P_{T1}$, so that the torque of the input shaft 20 after the initial reduction changes smoothly with a smaller amount of torque vibration following the first peak, as indicated in FIG. 20, than in the case indicated by broken line in FIG. 18 where the engine output reduction were not effected.

In the embodiment of FIG. 19, the engine output reducing means 202 is adapted to generate the engine output reducing command in step SC13, on the basis of the time lapse after the ignition timing, so that the engine output is reduced in synchronization with the ignition timing. Further, the lock-up clutch switching means 200 is adapted to generate the lock-up clutch releasing command in step SC8, on the basis of the ignition timing. Thus, the engine output reduction by the engine output reducing means 202 and the full releasing of the lock-up clutch 32 by the lock-up clutch switching means 200 are synchronized with the ignition of the engine 10, so that the engine output reduction has the intended torque reducing effect even where the period of the engine output reduction is comparatively short. Where the period of the engine output reduction is comparatively long, the engine output reduction provides the intended torque reducing effect even if the point of time of the determination of the full releasing of the lock-up clutch 32 differs or varies to a considerable extent.

Figure 22:
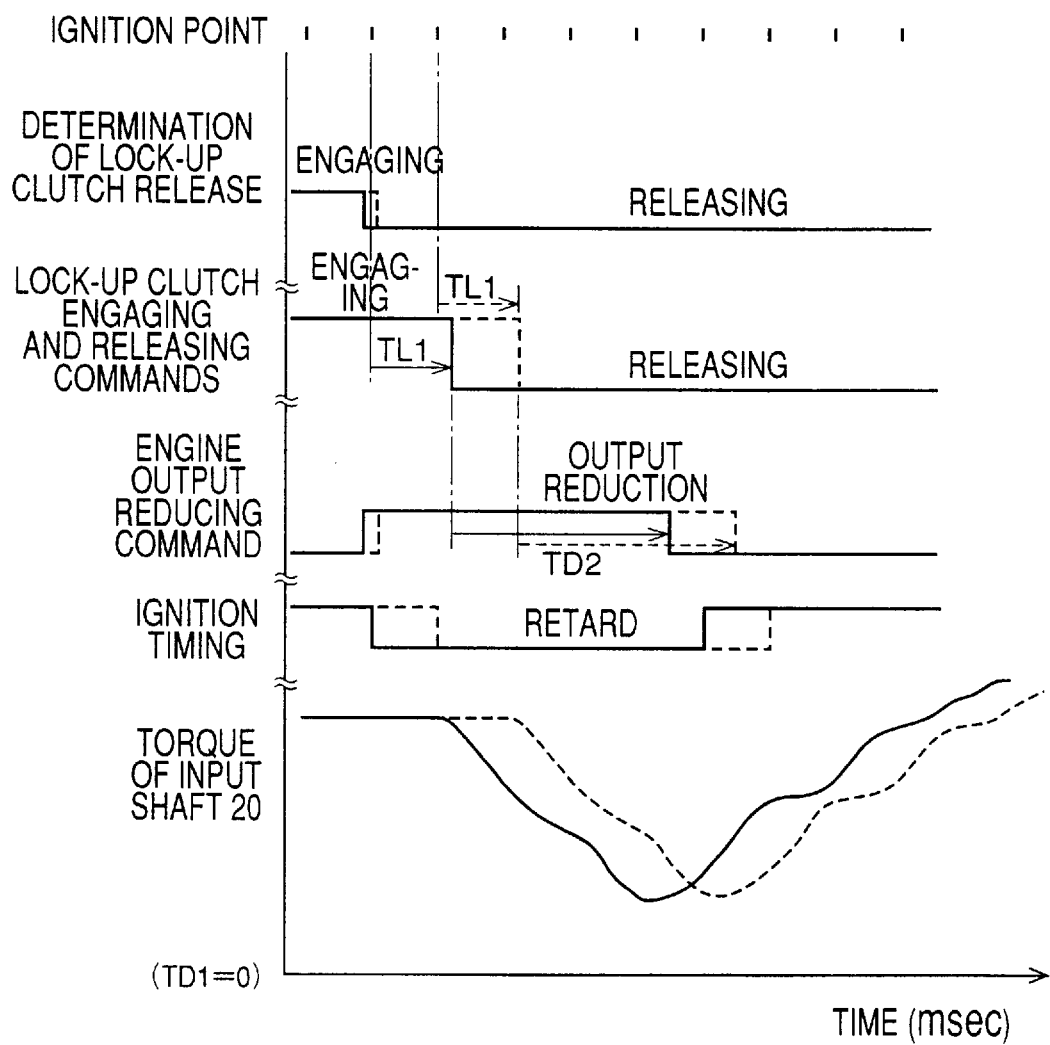
FIG. 22 is a time chart for explaining a case where the lock-up clutch releasing delay time TL1 as used in the routine of FIG. 13 is a time lapse after the ignition timing, and the torque reduction delay time TD1 is zeroed, in a yet further embodiment of the invention.
Figure 23:
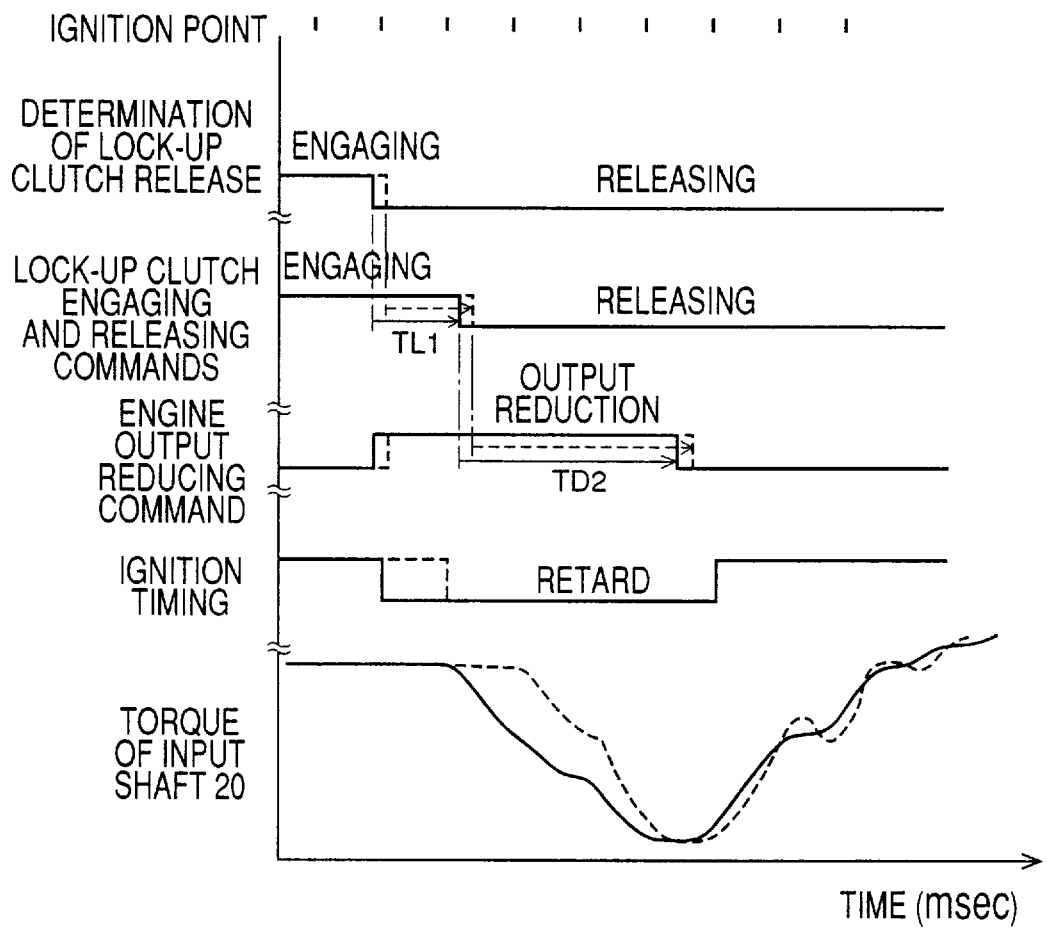
FIG. 23 is a time chart for comparison with that of FIG. 22, indicating changes in the transmission input shaft torque by solid and broken lines, corresponding to two slightly different points of time of determination of the lock-up clutch releasing, in a case where the torque reduction delay time TD1 as used in the routine of FIG. 13 is set to zero.

The graph of FIG. 22 shows a case where the torque reduction delay time TD1 and the lock-up clutch releasing delay time TL1 are time lapses after the ignition timing as in the embodiment of FIG. 19, and the delay time TD1 is set to zero as in the case of FIG. 15. In this case of FIG. 22, the engine output is reduced by the engine output reducing means 202 as soon as the lock-up clutch release determining means 204 has determined that the lock-up clutch 32 should be fully released, and the lock-up clutch switching means 200 generates the lock-up clutch releasing command for releasing the lock-up clutch 32 when the time lapse $t_{ew}$ after the ignition timing has reached the delay time TL1. In the present arrangement wherein the full releasing of the lock-up clutch 32 and the engine output reduction by retarding the ignition timing are synchronized with the ignition timing, the initial reduction and the subsequent vibration of the torque of the input shaft 20 are suitably reduced or mitigated even if the point of time of the determination of the full releasing of the lock-up clutch 32 by the lock-up clutch release determining means 204 differs as indicated by solid and broken lines in FIG. 22. The graph of FIG. 23 shows a variation in the point of time of the determination of the full releasing of the lock-up clutch 32, in a case where the torque reduction delay time TD1 is a time lapse after the determination of the full releasing of the lock-up clutch 32 as in the embodiment of FIG. 13 and where the delay time TD1 is set to zero. In this case of FIG. 23, even a slight difference in the point of time of the determination of the full releasing of the lock-up clutch 32 as indicated by solid and broken lines results in a comparatively large difference in the moment of initiation of the actual retarding of the ignition timing and the consequent engine output reduction, leading to a difference in the pattern of change of the torque to be transmitted to the input shaft 20 of the automatic transmission 14. In this case, therefore, the initial reduction and the subsequent vibration of the torque of the input shaft 20 cannot be sufficiently reduced or prevented.

Figure 24:
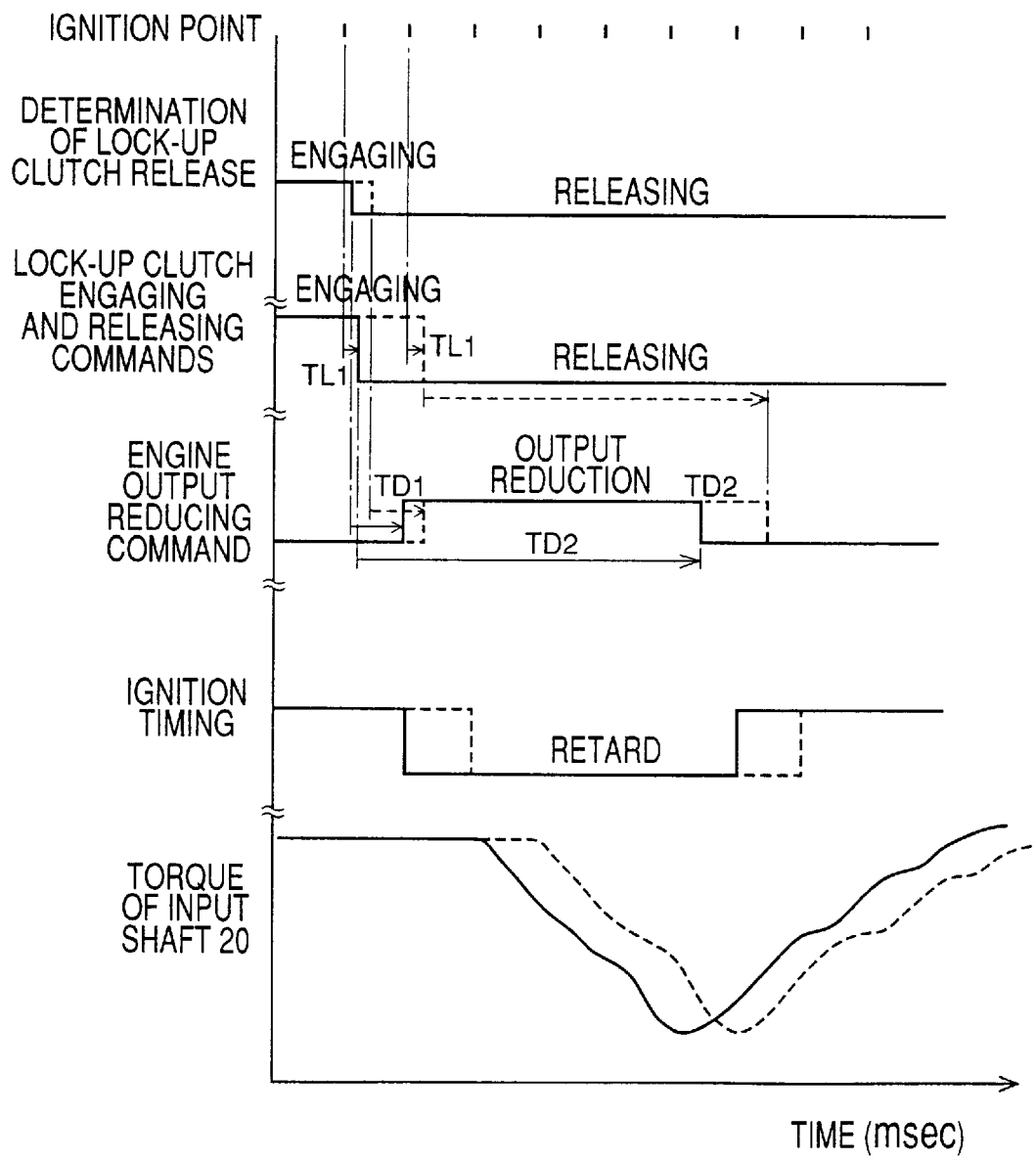
FIG. 24 is a time chart for explaining changes of the transmission input shaft torque in another embodiment of the invention, wherein the lock-up clutch releasing delay time TL1 as used in the routine of FIG. 13 is a time lapse after the ignition timing, and the delay time TL1 is shorter than the ignition period, in another embodiment of the invention.
Figure 25:
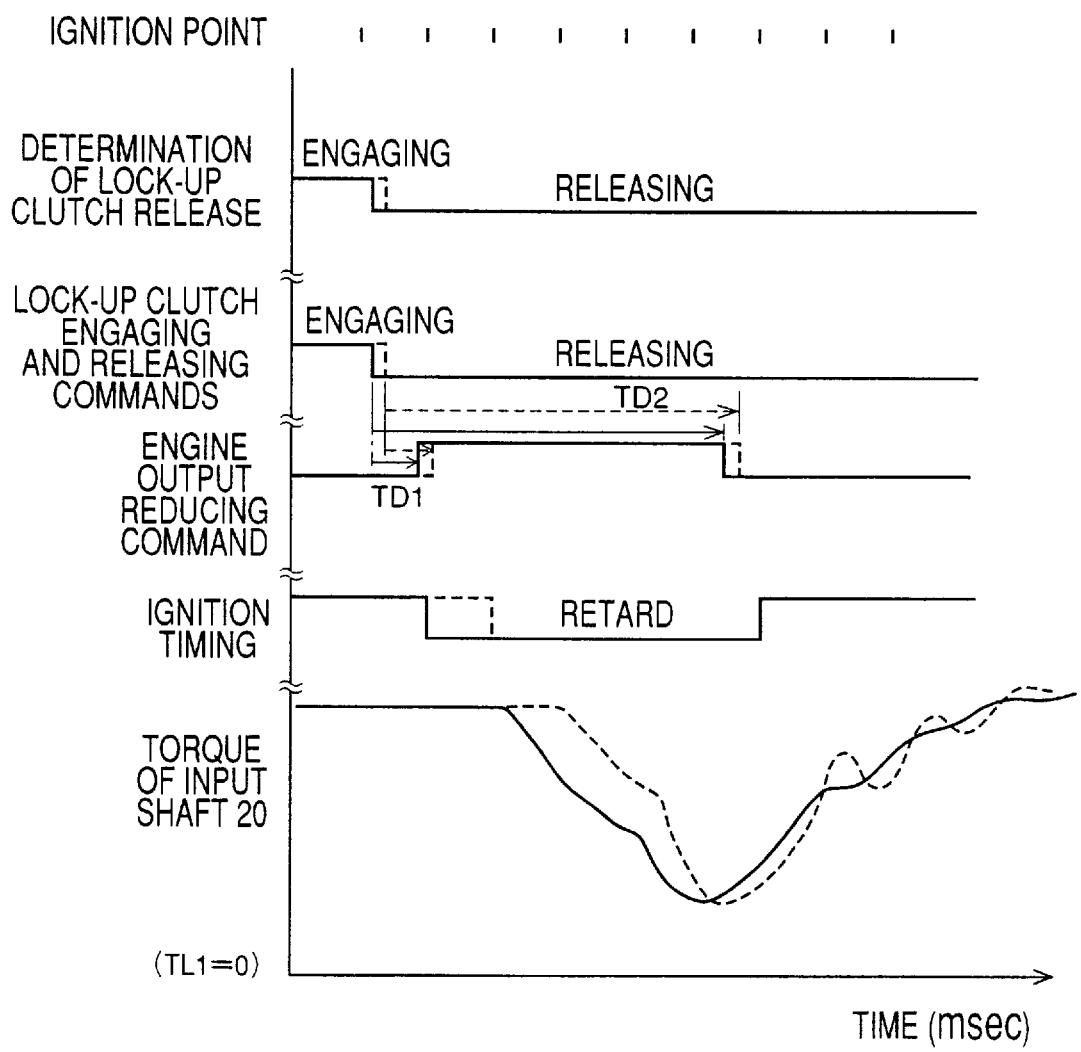
FIG. 25 is a time chart for comparison with that of FIG. 24, indicating changes of the transmission input shaft torque by solid and broken lines, corresponding to two slightly different points of time of determination of the lock-up clutch releasing, in a case where the lock-up clutch releasing delay time TL1 as used in the routine of FIG. 13 is set to zero.

The graph of FIG. 24 shows a case where the lock-up clutch releasing delay time TL1 are time lapses after the ignition timing as in the embodiment of FIG. 19, and the delay time TL1 is set to be smaller than the ignition period. In this case of FIG. 24, the lock-up clutch switching means 200 generates the lock-up clutch releasing command for releasing the lock-up clutch 32 when the time lapse $t_{ew}$ after the ignition timing has reached the delay time TL1. Although the generation of the engine output reducing command by the engine output reducing means 202 is based on the determination of the lock-up clutch releasing, the retarding of the ignition timing or the reduction of the number of the effective cylinders of the engine 10 in response to the engine output reducing command has the torque reducing effect in synchronization with the ignition timing. Therefore, the initial reduction and the subsequent vibration of the torque of the input shaft 20 are suitably reduced or mitigated even if the point of time of the determination of the full releasing of the lock-up clutch 32 by the lock-up clutch release determining means 204 differs as indicated by solid and broken lines in FIG. 22. The graph of FIG. 25 shows a variation in the point of time of the determination of the full releasing of the lock-up clutch 32, in the case of FIG. 13 where the ignition timing is not used and where the delay time TL1 is set to zero. In this case of FIG. 25, even a slight difference in the point of time of the determination of the full releasing of the lock-up clutch 32 as indicated by solid and broken lines results in a comparatively large difference in the moment of initiation of the actual retarding of the ignition timing and the consequent engine output reduction, leading to a difference in the pattern of change of the torque to be transmitted to the input shaft 20 of the automatic transmission 14. In this case, therefore, the initial reduction and the subsequent vibration of the torque of the input shaft 20 cannot be sufficiently reduced or prevented.

While the presently preferred embodiments of the invention have been described above by reference to the accompanying drawings, it is to be understood that the invention is not limited to the details of the illustrated embodiments, but may be otherwise embodied.

The embodiment of FIG. 13 includes the torque reduction delay time determining means 206 for determining the torque reduction delay time TD1 according t the relationship of FIG. 10, and the lock-up clutch releasing delay time determining means 210 for determining the lock-up clutch releasing delay time TL1 according to the relationship of FIG. 12. However, the delay time TD1 and/or TL1 may be a predetermined constant value. In this case, the determining means 206 and/or the determining means 210 may be eliminated.

In the embodiment of FIG. 13, the torque reduction delay time determining means 206 and the lock-up clutch releasing delay time determining means 210 determine the delay time TD1 and the delay time TL1, respectively, on the basis of the oil temperature $T_{OIL}$ and the engine speed $N_E$. However, the delay times TD1, TL1 may be determined on the basis of at least one of the oil temperature $T_{OIL}$, engine speed $N_E$ and engine load.

In the embodiment of FIG. 19, the torque reduction delay time T1 and the torque reduction terminating time T2 after the ignition timing are constant values, and the routine of FIG. 19 does not include a step for determining the delay time T1 and terminating time T2. However, a step of determining these times T1, T2 may be provided to be implemented if the affirmative decision (YES) is obtained in step SC10. This additional step corresponds to the torque reduction delay time determining means 206 and the torque reduction terminating time determining means 209.

In the embodiment of FIG. 19, the lock-up clutch releasing delay time T3 after the ignition timing is a constant value, and the routine of FIG. 19 does not include a step for determining the delay time T3. However, a step of determining the delay time T3 may be provided to be implemented if the affirmative decision (YES) is obtained in step SC3. This additional step corresponds to the lock-up clutch releasing delay time determining means 210.

In the illustrated embodiments, the lock-up clutch 32 is incorporated in the torque converter 12. However, the lock-up clutch may be provided in a fluid coupling. Further, the automatic transmission 14 may be replaced by a continuously variable transmission, and the engine 10 may be replaced by a diesel engine without a throttle valve.

Although the illustrated embodiments uses the linear solenoid valve SLU, the lock-up clutch control valve 56 and the data representative of the FIG. 8 relationship for controlling the lock-up clutch 32 in the slip control mode, the valves SLU, 56 may be eliminated while the data of FIG. 8 may be modified to eliminate the slip control area, where the power transmitting system is not arranged to permit the lock-up clutch 32 to be controlled in the slip control mode.

It is to be understood that the present invention may be embodied with various other changes, modifications and improvements, which may occur to those skilled in the art, without departing from the spirit and scope of the invention defined in the following claims.

What is claimed is:

1. An apparatus for controlling a releasing action of a lock-up clutch in a power transmitting system of a motor vehicle wherein the lock-up clutch is disposed between a pump impeller which receives a torque from an engine, and a turbine impeller which is operatively connected to a drive wheel of the motor vehicle, said lock-up clutch being engaged for direct connection of said pump impeller and said turbine impeller, said apparatus comprising:

lock-up clutch release determining means;

lock-up clutch switching means for effecting a releasing action of said lock-up clutch form a fully engaged state thereof to a fully released state thereof; and engine output reducing means for temporarily reducing an output of said engine responsive to a lock-up clutch release determination by said lock-up clutch release determining means.

2. An apparatus according to claim 1, wherein said engine output reducing means initiates reduction of the output of said engine before said lock-up clutch is brought to said fully released state by said lock-up clutch switching means.

3. An apparatus according to claim 2, wherein said engine output reducing means reduces the output of said engine when a torque to be transmitted to said turbine impeller has a first peak following a rapid reduction of said torque due to the releasing action of said lock-up clutch.

4. An apparatus according to claim 1, further comprising:

lock-up clutch release determining means for determining whether said lock-up clutch should be fully released, on the basis of a running condition of the motor vehicle and according to a predetermined relationship between said running condition and an operating state of said lock-up clutch; and torque reduction delay time determining means for determining a torque reduction delay time on the basis of at least one of a temperature of a working oil for operating said lock-up clutch, a speed of said engine and a load of said engine, and wherein said engine output reducing means generates an engine output reducing command for reducing the output of said engine when a time lapse after a moment of determination by said lock-up clutch release determining means that said lock-up clutch should be fully released has reached said torque reduction delay time determined by said torque reduction delay time determining means.

5. An apparatus according to claim 4, wherein said torque reduction delay time determining means determines said torque reduction delay time on the basis of said temperature of said working oil and according to a predetermined relationship between said temperature and said torque reduction delay time, such that said torque reduction delay time increases with a decrease in said temperature.

6. An apparatus according to claim 4, wherein said torque reduction delay time determining means determines said torque reduction delay time on the basis of at least one of said speed and said load of said engine and according to a predetermined relationship between said torque reduction delay time and said at least one of said speed and said load of said engine, such that said torque reduction delay time increases with an increase in said at least one of said speed and said load of said engine.

7. An apparatus according to claim 1, further comprising:
lock-up clutch release determining means for determining whether said lock-up clutch should be fully released, on the basis of a running condition of the motor vehicle and according to a predetermined relationship between said running condition and an operating state of said lock-up clutch; and
lock-up clutch releasing delay time determining means for determining a lock-up clutch releasing delay time on the basis of at least one of a temperature of a working oil for operating said lock-up clutch, a speed of said engine and a load of said engine,
and wherein said lock-up clutch switching means generates a lock-up clutch releasing command for fully releasing said lock-up clutch when a time lapse after a moment of determination by said lock-up clutch release determining means that said lock-up clutch should be fully released has reached said lock-up clutch releasing delay time determined by said lock-up clutch releasing delay time determining means.

8. An apparatus according to claim 7, wherein said lock-up clutch releasing delay time determining means determines said lock-up clutch releasing delay time on the basis of said temperature of said working oil and according to a predetermined relationship between said temperature and said lock-up clutch releasing delay time, such that said lock-up clutch releasing delay time increases with an increase in said temperature.

9. An apparatus according to claim 7, wherein said lock-up clutch releasing delay time determining means determines said lock-up releasing delay time on the basis of at least one of said speed and said load of said engine and according to a predetermined relationship between said lock-up clutch releasing delay time and said at least one of said speed and said load of said engine, such that said lock-up clutch releasing delay time decreases with an increase in said at least one of said speed and said load of said engine.

10. An apparatus according to claim 1, further comprising positive torque determining means for determining whether the motor vehicle is in a positive torque drive state in which a torque is transmitted from said engine to said drive wheel and wherein said engine output reducing means reduces the output of said engine when said positive torque determining means determines that the motor vehicle is in said positive torque drive state.

11. An apparatus according to claim 1, wherein said lock-up clutch switching means effects said releasing action of said lock-up clutch such that said releasing action takes place in synchronization with an ignition timing of said engine.

12. An apparatus for controlling a releasing action of a lock-up clutch in a power transmitting system of a motor vehicle wherein the lock-up clutch is disposed between a pump impeller which receives a torque from an engine, and a turbine impeller which is operatively connected to a drive wheel of the motor vehicle, said lock-up clutch being engaged for direct connection of said pump impeller and said turbine impeller, said apparatus comprising:
lock-up clutch switching means for effecting a releasing action of said lock-up clutch form a fully engaged state thereof to a fully released state thereof; and
engine output reducing means for temporarily reducing an output of said engine upon said releasing action of said lock-up clutch, wherein said engine output reducing means initiates reduction of the output of said engine before said lock-up clutch is brought to said fully released state by said lock-up clutch switching means.

13. An apparatus for controlling a releasing action of a lock-up clutch in a power transmitting system of a motor vehicle wherein the lock-up clutch is disposed between a pump impeller which receives a torque from an engine, and a turbine impeller which is operatively connected to a drive wheel of the motor vehicle, said lock-up clutch being engaged for direct connection of said pump impeller and said turbine impeller, said apparatus comprising:
lock-up clutch switching means for effecting a releasing action of said lock-up clutch form a fully engaged state thereof to a fully released state thereof;
engine output reducing means for temporarily reducing an output of said engine upon said releasing action of said lock-up clutch; and
positive torque determining means for determining whether the motor vehicle is in a positive torque drive state in which a torque is transmitted from said engine to said drive wheel, and wherein said engine output reducing means reduces the output of said engine when said positive torque determining means determines that the motor vehicle is in said positive torque drive state.

\* \* \* \* \*